(12) United States Patent
Koo et al.

(10) Patent No.: US 12,452,456 B2
(45) Date of Patent: Oct. 21, 2025

(54) IMAGE CODING METHOD AND APPARATUS THEREFOR

(71) Applicant: LG Electronics Inc., Seoul (KR)

(72) Inventors: Moonmo Koo, Seoul (KR); Seunghwan Kim, Seoul (KR); Jaehyun Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 53 days.

(21) Appl. No.: 18/286,706

(22) PCT Filed: Apr. 12, 2022

(86) PCT No.: PCT/KR2022/005250
§ 371 (c)(1),
(2) Date: Oct. 12, 2023

(87) PCT Pub. No.: WO2022/220528
PCT Pub. Date: Oct. 20, 2022

(65) Prior Publication Data
US 2024/0205456 A1    Jun. 20, 2024

Related U.S. Application Data

(60) Provisional application No. 63/174,013, filed on Apr. 12, 2021.

(51) Int. Cl.
*H04N 19/61* (2014.01)
*H04N 19/122* (2014.01)
(Continued)

(52) U.S. Cl.
CPC ........... *H04N 19/61* (2014.11); *H04N 19/122* (2014.11); *H04N 19/129* (2014.11);
(Continued)

(58) Field of Classification Search
CPC .... H04N 19/61; H04N 19/122; H04N 19/129; H04N 19/132; H04N 19/176; H04N 19/18; H04N 19/60
See application file for complete search history.

(56) References Cited

U.S. PATENT DOCUMENTS

| | | | | |
|---|---|---|---|---|
| 11,317,118 B2* | 4/2022 | Jung | ..................... | H04N 19/176 |
| 2008/0310507 A1* | 12/2008 | Ye | ......................... | H04N 19/18 |
| | | | | 375/E7.199 |

(Continued)

FOREIGN PATENT DOCUMENTS

| | | |
|---|---|---|
| KR | 10-2021-0019108 A | 2/2021 |
| WO | 2020/130661 A1 | 6/2020 |

OTHER PUBLICATIONS

Extended European Search Report in European Appln. No. 22788384.0, mailed on Feb. 10, 2025, 10 pages.

*Primary Examiner* — Tracy Y. Li
(74) *Attorney, Agent, or Firm* — Fish & Richardson P.C.

(57) ABSTRACT

An image decoding method according to this document comprises a step of deriving, for transform coefficients, modified transform coefficients on the basis of inverse secondary transform, wherein: the step of deriving the modified transform coefficients may comprise a step of deriving a transform kernel to be applied to the inverse secondary transform; on the basis of both the horizontal and vertical lengths of a target block being greater than or equal to 8 and the horizontal or vertical length being 8, the transform kernel may be set to a 64×32 matrix; and on the basis of both the horizontal and vertical lengths of the target block being 8, a 64×16 matrix sampled from the 64×32 matrix may be applied to the inverse secondary transform of the target block.

13 Claims, 21 Drawing Sheets

(51) Int. Cl.
*H04N 19/129* (2014.01)
*H04N 19/132* (2014.01)
*H04N 19/176* (2014.01)
*H04N 19/18* (2014.01)

(52) U.S. Cl.
CPC ......... *H04N 19/132* (2014.11); *H04N 19/176* (2014.11); *H04N 19/18* (2014.11)

(56) References Cited

U.S. PATENT DOCUMENTS

| | | | |
|---|---|---|---|
| 2019/0246142 A1* | 8/2019 | Zhao | H04N 19/132 |
| 2022/0014743 A1* | 1/2022 | Lee | H04N 19/593 |
| 2023/0007290 A1* | 1/2023 | Lim | H04N 19/70 |
| 2023/0269374 A1* | 8/2023 | Fan | H04N 19/46 375/240.18 |

* cited by examiner

FIG. 7
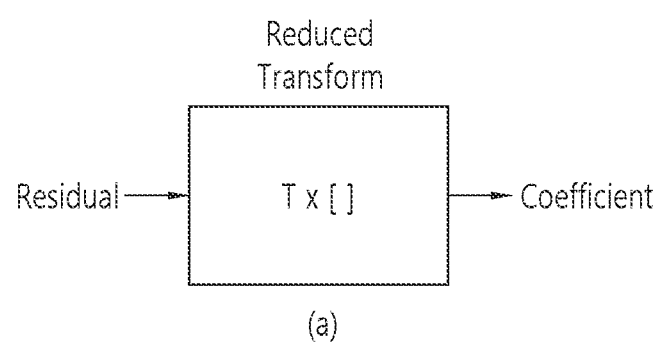
(a)
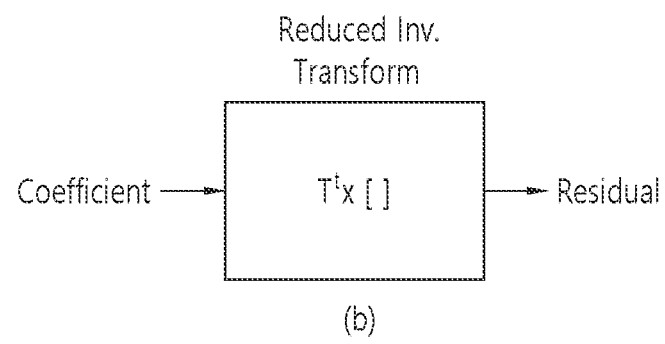
(b)

FIG. 8
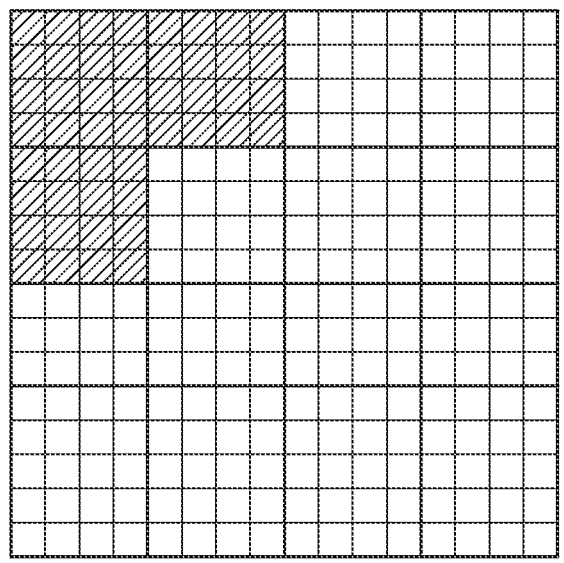
(a)
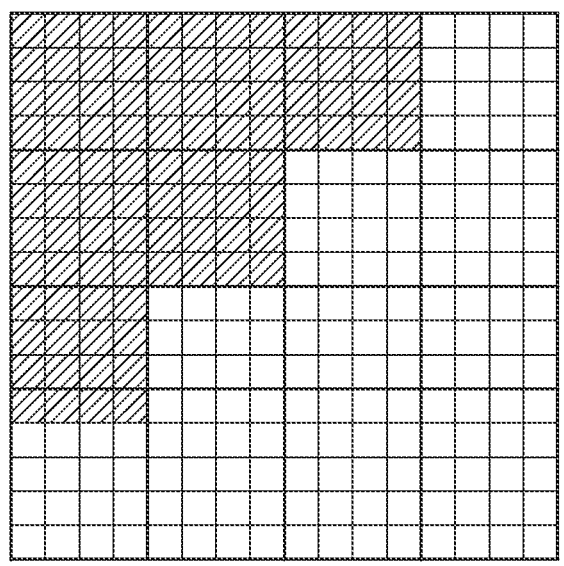
(b)

| 1 | 2 | 3 | 4 | 5 | 6 | 7 | 8 | 9 | 10 | 11 | 12 | | | | |
|---|---|---|---|---|---|---|---|---|---|---|---|---|---|---|---|
| 13 | 14 | 15 | 16 | 17 | 18 | 19 | 20 | 21 | 22 | 23 | 24 | | | | |
| 25 | 26 | 27 | 28 | 29 | 30 | 31 | 32 | 33 | 34 | 35 | 36 | | | | |
| 37 | 38 | 39 | 40 | 41 | 42 | 43 | 44 | 45 | 46 | 47 | 48 | | | | |
| 49 | 50 | 51 | 52 | 53 | 54 | 55 | 56 | | | | | | | | |
| 57 | 58 | 59 | 60 | 61 | 62 | 63 | 64 | | | | | | | | |
| 65 | 66 | 67 | 68 | 69 | 70 | 71 | 72 | | | | | | | | |
| 73 | 74 | 75 | 76 | 77 | 78 | 79 | 80 | | | | | | | | |
| 81 | 82 | 83 | 84 | | | | | | | | | | | | |
| 85 | 86 | 87 | 88 | | | | | | | | | | | | |
| 89 | 90 | 91 | 92 | | | | | | | | | | | | |
| 93 | 94 | 95 | 96 | | | | | | | | | | | | |
| | | | | | | | | | | | | | | | |
| | | | | | | | | | | | | | | | |
| | | | | | | | | | | | | | | | |
| | | | | | | | | | | | | | | | |

| 1 | 13 | 25 | 37 | 49 | 57 | 68 | 73 | 81 | 85 | 89 | 93 | | | | |
|---|----|----|----|----|----|----|----|----|----|----|----|--|--|--|--|
| 2 | 14 | 26 | 38 | 50 | 58 | 66 | 74 | 82 | 86 | 90 | 94 | | | | |
| 3 | 15 | 27 | 39 | 51 | 59 | 67 | 75 | 83 | 87 | 91 | 95 | | | | |
| 4 | 16 | 28 | 40 | 52 | 60 | 68 | 76 | 84 | 88 | 92 | 96 | | | | |
| 5 | 17 | 29 | 41 | 53 | 61 | 69 | 77 | | | | | | | | |
| 6 | 18 | 30 | 42 | 54 | 62 | 70 | 78 | | | | | | | | |
| 7 | 19 | 31 | 43 | 55 | 63 | 71 | 79 | | | | | | | | |
| 8 | 20 | 32 | 44 | 56 | 64 | 72 | 80 | | | | | | | | |
| 9 | 21 | 33 | 45 | | | | | | | | | | | | |
| 10 | 22 | 34 | 46 | | | | | | | | | | | | |
| 11 | 23 | 35 | 47 | | | | | | | | | | | | |
| 12 | 24 | 36 | 48 | | | | | | | | | | | | |
| | | | | | | | | | | | | | | | |
| | | | | | | | | | | | | | | | |
| | | | | | | | | | | | | | | | |
| | | | | | | | | | | | | | | | |

FIG. 11
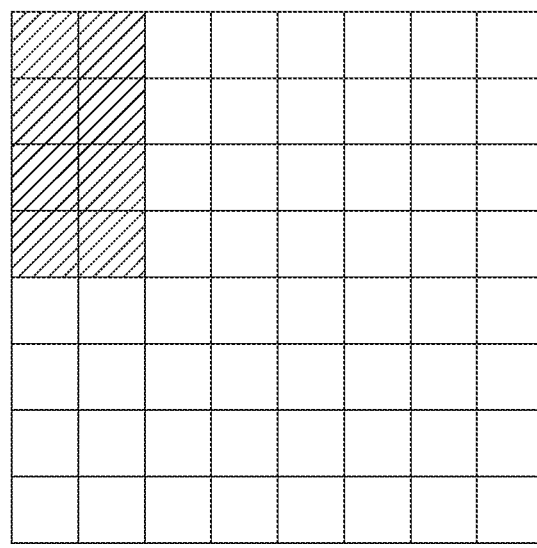
(a)
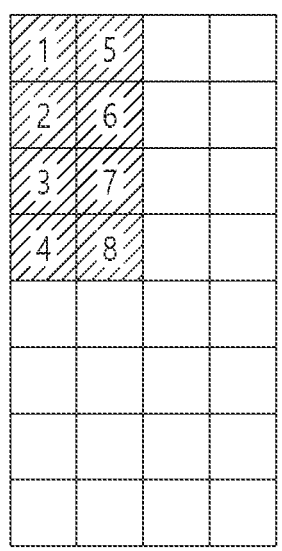 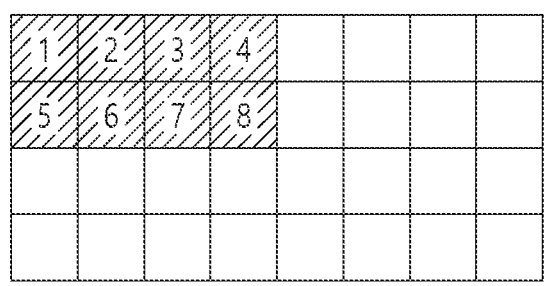
(b)

FIG. 12
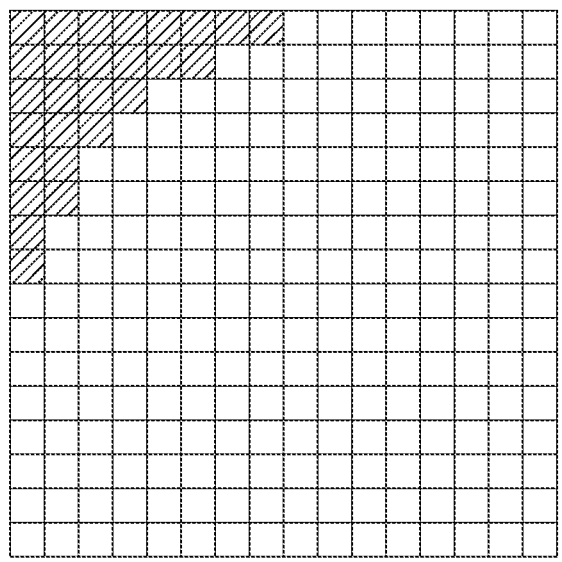
(a)
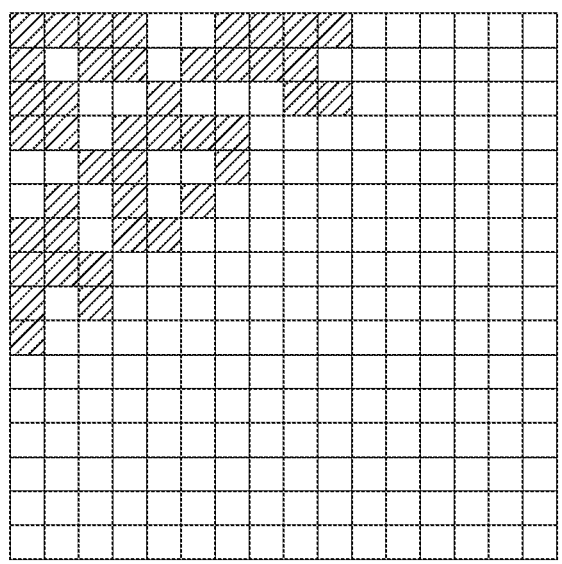
(b)

FIG. 13
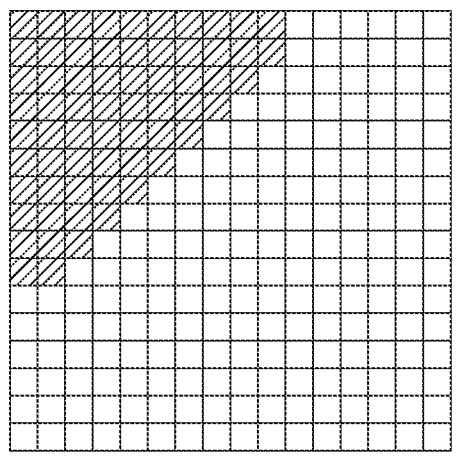
(a)
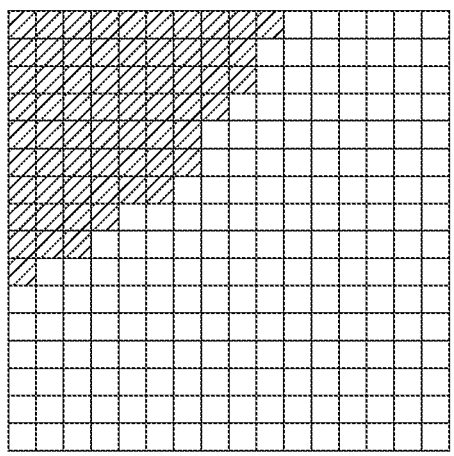
(b)
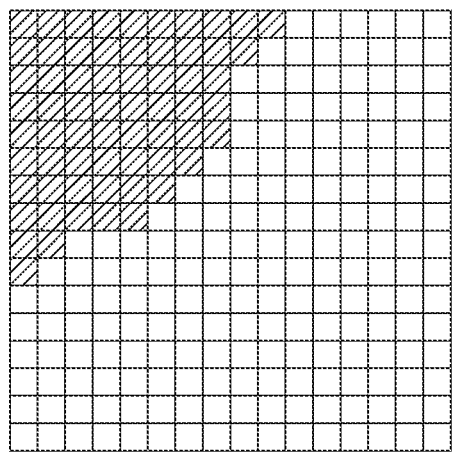
(c)

FIG. 14
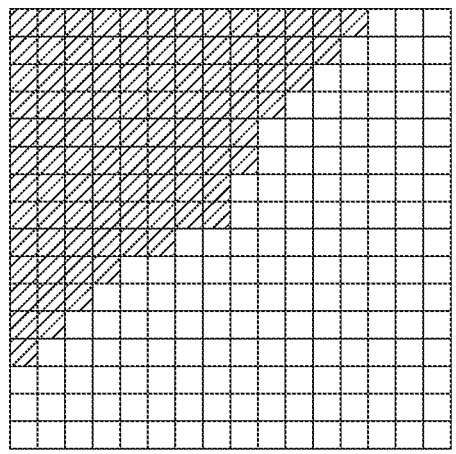
(a)
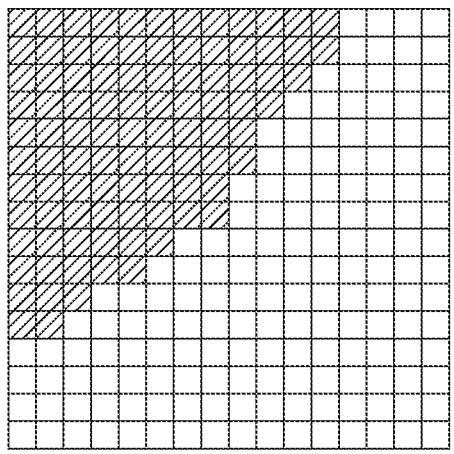
(b)
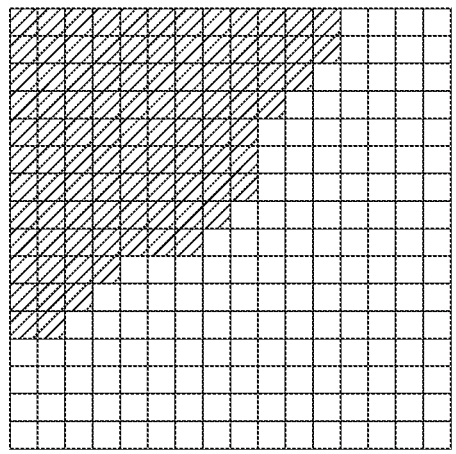
(c)
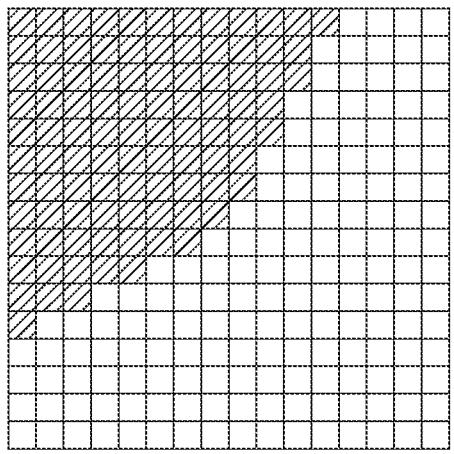
(d)

FIG. 15

| 1 | 3 | 6 | 10 | 33 | 35 | 38 | 42 | 81 | 83 | 86 | 90 | | | | |
|---|---|---|---|---|---|---|---|---|---|---|---|---|---|---|---|
| 2 | 5 | 9 | 13 | 34 | 37 | 41 | 45 | 82 | 85 | 89 | 93 | | | | |
| 4 | 8 | 12 | 15 | 36 | 40 | 44 | 47 | 84 | 88 | 92 | 95 | | | | |
| 7 | 11 | 14 | 16 | 39 | 43 | 46 | 48 | 87 | 91 | 94 | 96 | | | | |
| 17 | 19 | 22 | 26 | 65 | 67 | 70 | 74 | | | | | | | | |
| 19 | 21 | 25 | 29 | 66 | 69 | 73 | 77 | | | | | | | | |
| 20 | 24 | 28 | 31 | 68 | 72 | 76 | 79 | | | | | | | | |
| 23 | 27 | 30 | 32 | 71 | 75 | 78 | 80 | | | | | | | | |
| 49 | 51 | 54 | 58 | | | | | | | | | | | | |
| 50 | 53 | 57 | 61 | | | | | | | | | | | | |
| 52 | 56 | 60 | 63 | | | | | | | | | | | | |
| 55 | 59 | 62 | 64 | | | | | | | | | | | | |
| | | | | | | | | | | | | | | | |
| | | | | | | | | | | | | | | | |
| | | | | | | | | | | | | | | | |
| | | | | | | | | | | | | | | | |

FIG. 16
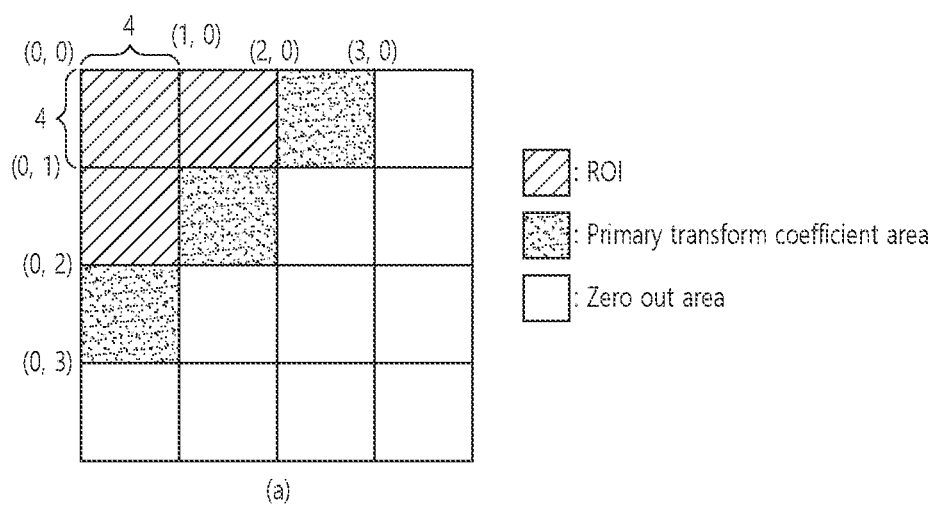
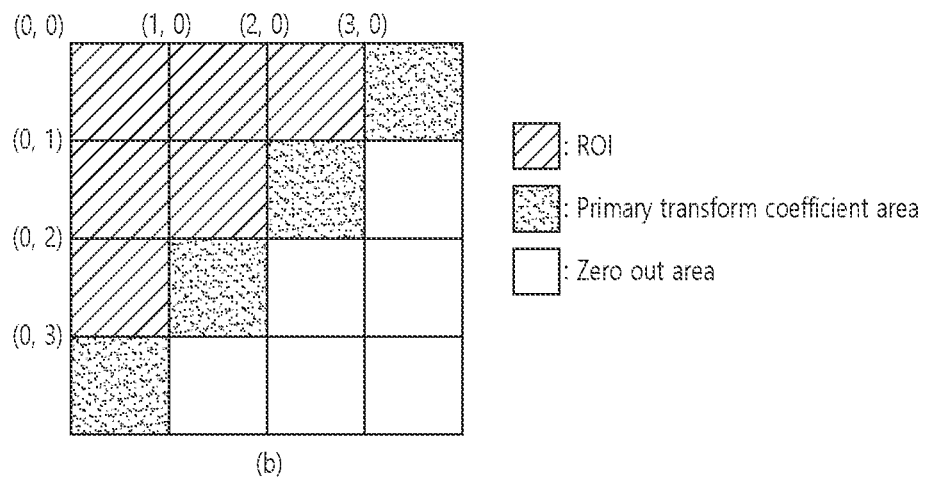

IMAGE CODING METHOD AND APPARATUS THEREFOR

CROSS-REFERENCE TO RELATED APPLICATIONS

This application is a National Stage application under 35 U.S.C. § 371 of International Application No. PCT/KR2022/005250, filed on Apr. 12, 2022, which claims the benefit of U.S. Provisional Application No. 63/174,013, filed on Apr. 12, 2021. The disclosures of the prior applications are incorporated by reference in their entirety.

TECHNICAL FIELD

This document relates to image coding technology, and more particularly, to an image coding method and apparatus based on intra prediction in an image coding system.

BACKGROUND

Nowadays, the demand for high-resolution and high-quality images/videos such as 4K, 8K or more ultra high definition (UHD) images/videos has been increasing in various fields. As the image/video data becomes higher resolution and higher quality, the transmitted information amount or bit amount increases as compared to the conventional image data. Therefore, when image data is transmitted using a medium such as a conventional wired/wireless broadband line or image/video data is stored using an existing storage medium, the transmission cost and the storage cost thereof are increased.

Further, nowadays, the interest and demand for immersive media such as virtual reality (VR), artificial reality (AR) content or hologram, or the like is increasing, and broadcasting for images/videos having image features different from those of real images, such as a game image is increasing.

Accordingly, there is a need for a highly efficient image/video compression technique for effectively compressing and transmitting or storing, and reproducing information of high resolution and high quality images/videos having various features as described above.

SUMMARY

The technical problem of this document is to provide a method and apparatus for increasing image coding efficiency.

Another technical task of this document is to provide an image coding method and device to which LFNST is applied under various conditions.

Another technical task of this document is to provide an image coding method and device that adjusts the zero-out area to increase image coding efficiency.

Another technical task of this document is to provide an image coding method and device that sets the LFNST kernel by considering the computational complexity of the sample.

Another technical problem of this document is to provide an image coding method and apparatus to which LFNST is applied, which can improve coding performance and minimize complexity.

According to an embodiment of this document, a video decoding method performed by a decoding device is provided. The method comprises deriving modified transform coefficients based on an inverse second-order transform for the transform coefficients, wherein the deriving the modified transform coefficients includes deriving a transform kernel to be applied to the inverse second-order transform, wherein, based on that a horizontal length and a vertical length of the target block are both greater than or equal to 8, and the horizontal length or the vertical length is 8, the transform kernel is set to a 64×32 matrix, and wherein, based on that both the horizontal length and the vertical length of the target block are 8, a 64×16 matrix sampled from the 64×32 matrix may be applied to the inverse second-order transform of the target block.

Based on that both the horizontal length and the vertical length of the target block are greater than or equal to 4 and the horizontal length or the vertical length is 4, the transform kernel is set to a 16×16 matrix, and based on that both the horizontal length and the vertical length of the target block are greater than or equal to 16, the transform kernel may be set to a 96×32 matrix.

The deriving the modified transform coefficients comprises deriving an input array by sorting the transform coefficients according to a forward diagonal scanning order; deriving a larger number of modified transform coefficients than the transform coefficients through a matrix operation of the input array and a transform kernel; and arranging the modified transform coefficients in an output area, wherein the output area may be composed of a plurality of 4×4 sub-blocks that can be arranged according to scanning order from a DC position of the target block.

After the modified transform coefficients are derived, the target block may include the output area, a primary transform coefficient area where the transform coefficients exist, and a zero out area where a transform coefficient value is 0.

The primary transform coefficient area may include 4×4 sub-blocks in a diagonal direction adjacent to the output area.

Based on that both the horizontal length and vertical length of the target block are greater than or equal to 4 and the horizontal length or the vertical length is 4, the primary transform coefficient area may be a right 4×4 subblock or a lower 4×4 subblock of the output area.

According to an embodiment of this document, an image encoding method performed by an encoding device is provided. The method comprises deriving modified transform coefficients based on a second-order transform for the transform coefficients, wherein the deriving the modified transform coefficient includes deriving a transform kernel to be applied to the second-order transform, wherein, based on that a horizontal length and a vertical length of the target block are both greater than or equal to 8, and the horizontal length or the vertical length is 8, the transform kernel is set to a 32×64 matrix, and wherein, based on that both the horizontal length and the vertical length of the target block are 8, a 16×64 matrix sampled from the 32×64 matrix may be applied to the second-order transform of the target block.

According to another embodiment of this document, a digital storage medium storing image data including encoded image information and/or bitstream generated according to an image encoding method performed by an encoding device and a method for transmitting such image information and/or bitstream may be provided.

According to another embodiment of this document, a digital storage medium storing image data including encoded image information and/or a bitstream causing the decoding device to perform the image decoding method and a method for transmitting such image information and/or bitstream may be provided.

According to the present disclosure, it is possible to increase overall image/video compression efficiency.

According to this document, an image coding method and apparatus to which LFNST is applied may be provided under various conditions.

According to this document, the coding efficiency of the image can be increased by adjusting the zero-out area when applying LFNST in various ways.

According to this document, the LFNST kernel can be set by considering the computational complexity of the sample.

According to this document, an LFNST-applied video coding method and apparatus capable of improving coding performance and minimizing complexity can be provided.

The effects that can be obtained through specific examples of the present disclosure are not limited to the effects listed above. For example, there may be various technical effects that a person having ordinary skill in the related art can understand or derive from the present disclosure. Accordingly, specific effects of the present disclosure are not limited to those explicitly described in the present disclosure and may include various effects that can be understood or derived from the technical features of the present disclosure.

BRIEF DESCRIPTION OF THE DRAWINGS

FIG. 7 is a diagram for explaining RST according to an embodiment of the present document.

FIG. 8 is a diagram illustrating a forward LFNST input area according to an embodiment of the present document.

FIG. 9a and FIG. 9b are diagrams illustrating an input sequence of input data according to an embodiment of the present document.

FIG. 10a and FIG. 10b are diagrams illustrating an input sequence of input data according to another embodiment of the present document.

FIG. 11 is a diagram illustrating a non-square ROI according to an embodiment of the present document.

FIG. 12 is a diagram illustrating an irregularly shaped ROI according to another embodiment of the present document.

FIG. 13 is a diagram illustrating a 64-sample ROI having an irregular shape according to an embodiment of the present document.

FIG. 14 is a diagram illustrating a 96-sample ROI having an irregular shape according to an embodiment of the present document.

FIG. 15 is a diagram showing the scanning order of transform coefficients according to an embodiment of this document.

FIG. 16 is a diagram to explain zero out of the primary transform coefficient according to an embodiment of this document.

MODE

Figure 1:
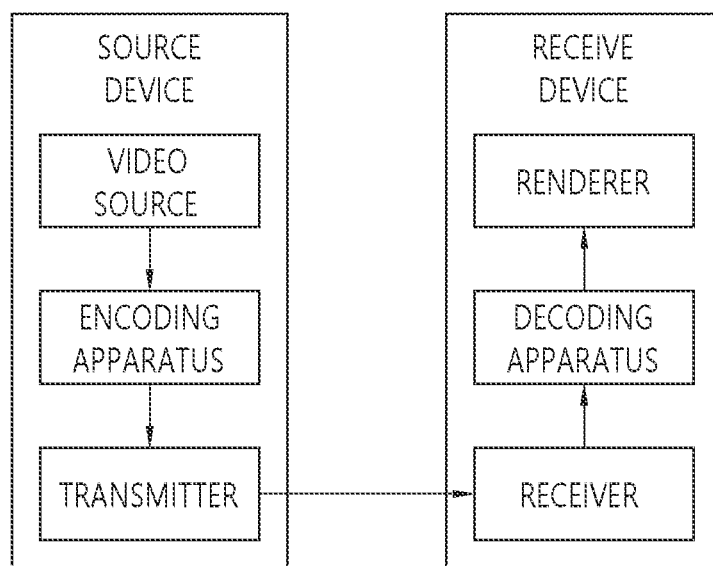
FIG. 1 schematically illustrates an example of a video/image coding system to which the present disclosure is applicable.

While the present disclosure may be susceptible to various modifications and include various embodiments, specific embodiments thereof have been shown in the drawings by way of example and will now be described in detail. However, this is not intended to limit the present disclosure to the specific embodiments disclosed herein. The terminology used herein is for the purpose of describing specific embodiments only, and is not intended to limit technical idea of the present disclosure. The singular forms may include the plural forms unless the context clearly indicates otherwise. The terms such as "include" and "have" are intended to indicate that features, numbers, steps, operations, elements, components, or combinations thereof used in the following description exist, and thus should not be understood as that the possibility of existence or addition of one or more different features, numbers, steps, operations, elements, components, or combinations thereof is excluded in advance.

Meanwhile, each component on the drawings described herein is illustrated independently for convenience of description as to characteristic functions different from each other, and however, it is not meant that each component is realized by a separate hardware or software. For example, any two or more of these components may be combined to form a single component, and any single component may be divided into plural components. The embodiments in which components are combined and/or divided will belong to the scope of the patent right of the present disclosure as long as they do not depart from the essence of the present disclosure.

Hereinafter, preferred embodiments of the present disclosure will be explained in more detail while referring to the attached drawings. In addition, the same reference signs are used for the same components on the drawings, and repeated descriptions for the same components will be omitted.

This document relates to video/image coding. For example, the method/example disclosed in this document may relate to a VVC (Versatile Video Coding) standard (ITU-T Rec. H.266), a next-generation video/image coding standard after VVC, or other video coding related standards (e.g., HEVC (High Efficiency Video Coding) standard (ITU-T Rec. H.265), EVC (essential video coding) standard, AVS2 standard, etc.).

In this document, a variety of embodiments relating to video/image coding may be provided, and, unless specified to the contrary, the embodiments may be combined to each other and be performed. In this document, a video may mean a set of a series of images over time.

Technical features individually described in one figure in the present disclosure may be individually implemented or may be simultaneously implemented.

FIG. 1 schematically illustrates an example of a video/image coding system to which the present disclosure is applicable.

Referring to FIG. 1, the video/image coding system may include a first device (source device) and a second device (receive device). The source device may deliver encoded video/image information or data in the form of a file or streaming to the receive device via a digital storage medium or network.

The source device may include a video source, an encoding apparatus, and a transmitter. The receive device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may obtain a video/image through a process of capturing, synthesizing, or generating a video/image. The video source may include a video/image capture device and/or a video/image generating device. The video/image capture device may include, for example, one or more cameras, video/image archives including previously captured video/images, or the like. The video/image generating device may include, for example, a computer, a tablet and a smartphone, and may (electronically) generate a video/image. For example, a virtual video/image may be generated through a computer or the like. In this case, the video/image capturing process may be replaced by a process of generating related data.

The encoding apparatus may encode an input video/image. The encoding apparatus may perform a series of procedures such as prediction, transform, and quantization for compression and coding efficiency. The encoded data (encoded video/image information) may be output in the form of a bitstream.

The transmitter may transmit the encoded video/image information or data output in the form of a bitstream to the receiver of the receive device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format, and may include an element for transmission through a broadcast/communication network. The receiver may receive/extract the bitstream and transmit the received/extracted bitstream to the decoding apparatus.

The decoding apparatus may decode a video/image by performing a series of procedures such as dequantization, inverse transform, prediction, and the like corresponding to the operation of the encoding apparatus.

The renderer may render the decoded video/image. The rendered video/image may be displayed through the display.

Figure 2:
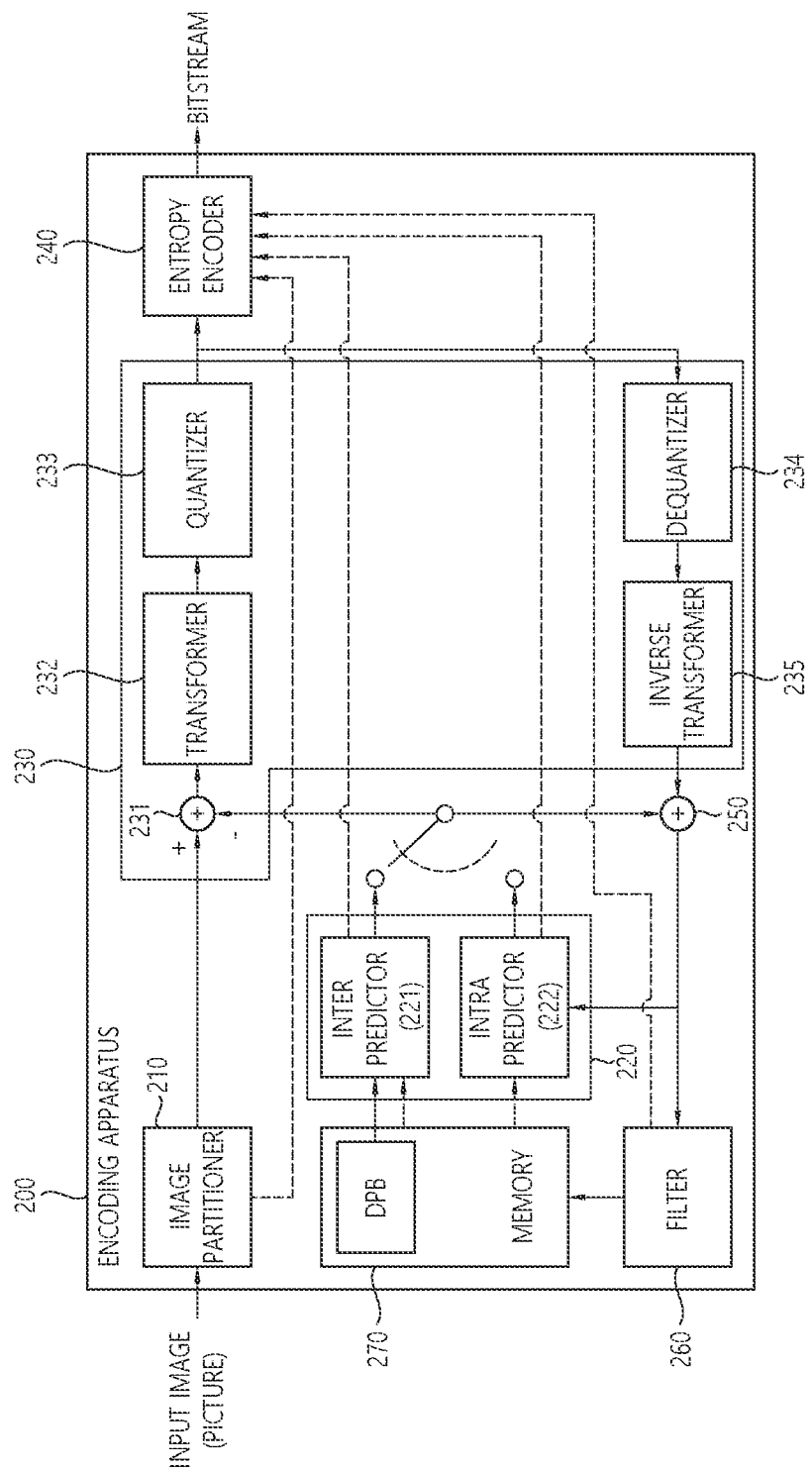
FIG. 2 is a diagram schematically illustrating a configuration of a video/image encoding apparatus to which the present disclosure is applicable.

FIG. 2 is a diagram schematically illustrating a configuration of a video/image encoding apparatus to which the present disclosure is applicable. Hereinafter, what is referred to as the video encoding apparatus may include an image encoding apparatus.

Referring to FIG. 2, the encoding apparatus 200 may include an image partitioner 210, a predictor 220, a residual processor 230, an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, an inverse transformer 235. The residual processor 230 may further include a subtractor 231. The adder 250 may be called a reconstructor or reconstructed block generator. The image partitioner 210, the predictor 220, the residual processor 230, the entropy encoder 240, the adder 250, and the filter 260, which have been described above, may be constituted by one or more hardware components (e.g., encoder chipsets or processors) according to an embodiment. Further, the memory 270 may include a decoded picture buffer (DPB), and may be constituted by a digital storage medium. The hardware component may further include the memory 270 as an internal/external component.

The image partitioner 210 may partition an input image (or a picture or a frame) input to the encoding apparatus 200 into one or more processing units. As one example, the processing unit may be called a coding unit (CU). As another example, the processing unit may further include a prediction unit (PU) or a transform unit (TU). In this case, the prediction unit and the transform unit may be split or partitioned from the above-described final coding unit. The prediction unit may be a unit of sample prediction, and the transform unit may be a unit for deriving a transform coefficient and/or a unit for deriving a residual signal from a transform coefficient.

The unit and a term such as a block, an area, or the like may be used in place of each other according to circumstances. In a general case, an M×N block may represent a set of samples or transform coefficients consisting of M columns and N rows. The sample may generally represent a pixel or a value of a pixel.

The subtractor 231 subtracts a prediction signal (predicted block, prediction sample array) output from the predictor 220 from an input image signal (original block, original sample array) to generate a residual signal (residual block, residual sample array). The generated residual signal is transmitted to the transformer 232.

The prediction unit 220 may perform prediction on a block to be processed (hereinafter referred to as a current block) and generate a predicted block including predicted samples of the current block. The predictor 220 may determine whether intra prediction or inter prediction is applied in units of current blocks or CUs. The prediction unit may generate various types of information related to prediction, such as prediction mode information, and transmit them to the entropy encoding unit 240. Prediction-related information may be encoded in the entropy encoding unit 240 and output in the form of a bitstream.

The intra predictor 222 may predict the current block by referring to samples (reference samples) in the current picture. In intra prediction, prediction modes may include a plurality of non-directional modes and a plurality of directional modes. The intra predictor 222 may determine a prediction mode applied to the current block by using a prediction mode applied to neighboring blocks.

The inter predictor 221 may derive a predicted block for the current block based on a reference block (reference sample array) specified by a motion vector on a reference picture. At this time, in order to reduce the amount of motion information transmitted in the inter prediction mode, the motion information may be predicted on a block, subblock, or sample basis based on correlation of motion information between the neighboring block and the current block. The motion information may include a motion vector and a reference picture index.

The prediction signal generated through the inter predictor 221 and/or the intra predictor 222 may be used to generate a reconstructed signal or to generate a residual signal.

The transform unit 232 may generate transform coefficients by applying a transform technique to the residual signal, for example, the transformation technique may include Discrete Cosine Transform (DCT), Discrete Sine Transform (DST), Graph-Based Transform (GBT), Karhunen Loeve Transform (KLT), or Conditionally Non-linear Transform (CNT). The conversion unit 232 may perform a primary conversion and/or a secondary conversion.

The quantizer 233 may quantize the transform coefficients and transmit them to the entropy encoder 240, and the entropy encoder 240 may encode the quantized signal (information on the quantized transform coefficients) and output the encoded signal in a bitstream. The information on the quantized transform coefficients may be referred to as residual information. The quantizer 233 may rearrange block type quantized transform coefficients into a one-dimensional vector form based on a coefficient scan order, and generate information on the quantized transform coefficients based on the quantized transform coefficients of the one-dimensional vector form.

The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (e.g. values of syntax elements, etc.) together or separately. A transmitter (not shown) which transmits a signal output from the entropy encoder 240 and/or a storage (not shown) which stores it may be configured as an internal/external element of the encoding apparatus 200, or the transmitter may be included in the entropy encoder 240.

Quantized transform coefficients output from the quantizer 233 may be used to generate a prediction signal. For example, by applying dequantization and inverse transform to quantized transform coefficients through the dequantizer 234 and the inverse transformer 235, the residual signal (residual block or residual samples) may be reconstructed.

The adder 155 adds the reconstructed residual signal to a prediction signal output from the inter predictor 221 or the intra predictor 222, so that a reconstructed signal (reconstructed picture, reconstructed block, reconstructed sample array) may be generated. When there is no residual for a processing target block as in a case where the skip mode is applied, the predicted block may be used as a reconstructed block. The adder 250 may be called a reconstructor or a reconstructed block generator. The generated reconstructed signal may be used for intra prediction of a next processing target block in the current block, and as described later, may be used for inter prediction of a next picture through filtering.

The filter 260 may improve subjective/objective video quality by applying the filtering to the reconstructed signal. For example, the filter 260 may generate a modified reconstructed picture by applying various filtering methods to the reconstructed picture, and may store the modified reconstructed picture in the memory 270, specifically in the DPB of the memory 270. The various filtering methods may include, for example, deblocking filtering, sample adaptive offset, an adaptive loop filter, a bilateral filter or the like.

The modified reconstructed picture which has been transmitted to the memory 270 may be used as a reference picture in the inter predictor 221. Through this, the encoding apparatus can avoid prediction mismatch in the encoding apparatus 100 and a decoding apparatus when the inter prediction is applied, and can also improve coding efficiency.

The memory 270 DPB may store the modified reconstructed picture in order to use it as a reference picture in the inter predictor 221. The memory 270 may store motion information of a block in the current picture, from which motion information has been derived (or encoded) and/or motion information of blocks in an already reconstructed picture. The memory 270 may store reconstructed samples of reconstructed blocks in the current picture, and transmit them to the intra predictor 222.

Figure 3:
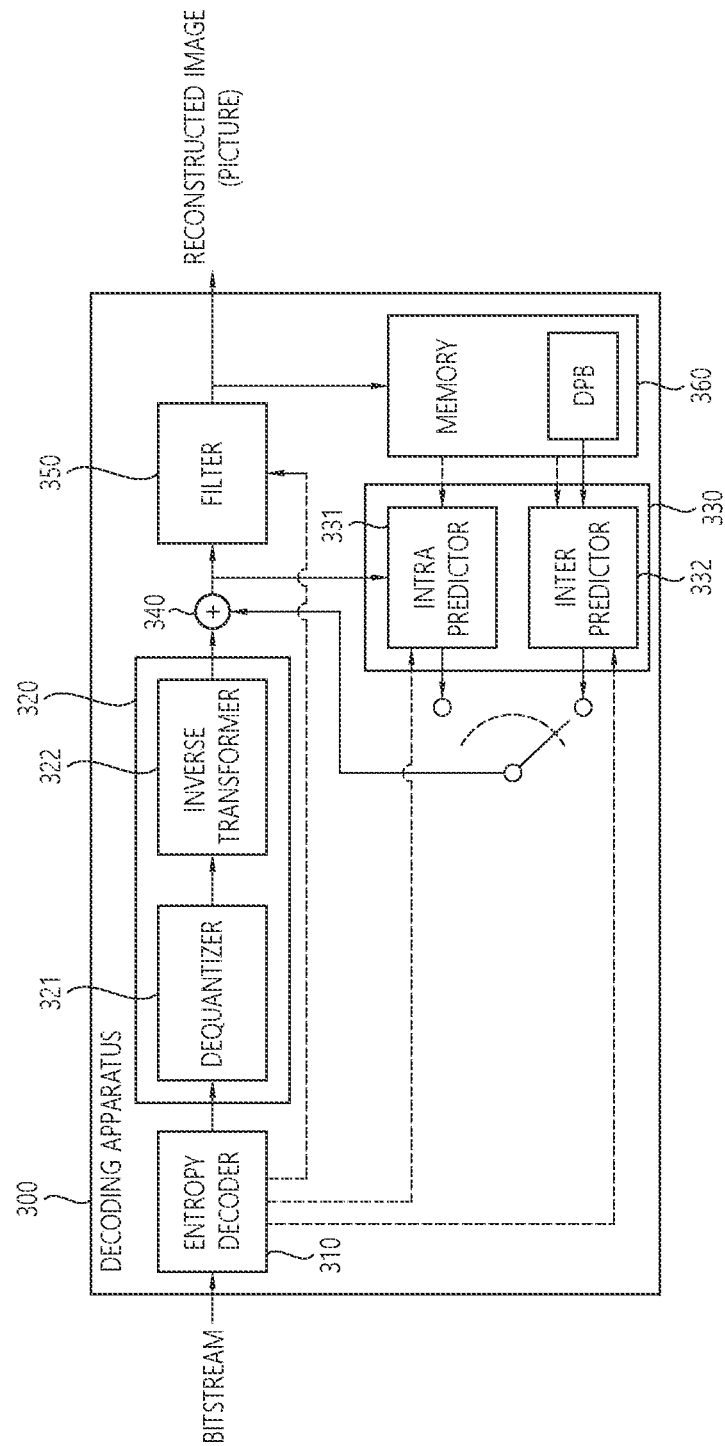
FIG. 3 is a diagram schematically illustrating a configuration of a video/image decoding apparatus to which the present disclosure is applicable.

FIG. 3 is a diagram schematically illustrating a configuration of a video/image decoding apparatus to which the present disclosure is applicable.

Referring to FIG. 3, the video decoding apparatus 300 may include an entropy decoder 310, a residual processor 320, a predictor 330, an adder 340, a filter 350 and a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350, which have been described above, may be constituted by one or more hardware components (e.g., decoder chipsets or processors) according to an embodiment. Further, the memory 360 may include a decoded picture buffer (DPB), and may be constituted by a digital storage medium. The hardware component may further include the memory 360 as an internal/external component.

When a bitstream including video/image information is input, the decoding apparatus 300 may reconstruct an image correspondingly to a process by which video/image information has been processed in the encoding apparatus of FIG. 2. A processing unit of decoding may be, for example, a coding unit, a prediction unit or a transform unit. One or more transform units may be derived from a coding unit.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (e.g., video/image information) required for image reconstruction (or picture reconstruction). In the present disclosure, signaled/received information and/or syntax elements, which will be described later, may be decoded through the decoding procedure and be obtained from the bitstream.

The dequantizer 321 may output transform coefficients by dequantizing the quantized transform coefficients. The dequantizer 321 may rearrange the quantized transform coefficients in the form of a two-dimensional block. In this case, the rearrangement may perform rearrangement based on an order of coefficient scanning which has been performed in the encoding apparatus. The dequantizer 321 may perform dequantization on the quantized transform coefficients using quantization parameter (e.g., quantization step size information), and obtain transform coefficients.

In the inverse transform unit 322, a residual signal (residual block, residual sample array) is obtained by inverse transforming the transform coefficients, the inverse transform unit 322 may perform inverse primary transform and/or inverse secondary transform.

The prediction unit 330 may perform prediction on a current block and generate a predicted block including predicted samples of the current block.

The intra predictor 331 may predict the current block by referring to the samples in the current picture. The referred samples may be located in the neighbor of or apart from the current block according to the prediction mode. In the intra prediction, prediction modes may include a plurality of non-directional modes and a plurality of directional modes. The intra predictor 331 may determine the prediction mode applied to the current block by using the prediction mode applied to the neighboring block.

The inter predictor 332 may derive a predicted block for the current block based on a reference block (reference sample array) specified by a motion vector on a reference picture. In the case of inter prediction, the neighboring block may include a spatial neighboring block existing in the current picture and a temporal neighboring block existing in the reference picture. For example, the inter predictor 332 may configure a motion information candidate list based on neighboring blocks, and derive a motion vector and/or a reference picture index of the current block based on received candidate selection information. Inter prediction may be performed based on various prediction modes, and the information on prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, prediction sample array) output from the predictor 330. When there is no residual for a processing target block as in a case where the skip mode is applied, the predicted block may be used as a reconstructed block. The generated reconstructed signal may be used for intra prediction of a next processing target block in the current block, and as described later, may be output through filtering or be used for inter prediction of a next picture.

The filtering unit 350 may improve subjective/objective picture quality by applying filtering to the reconstructed signal. For example, the filtering unit 350 may generate a modified reconstructed picture by applying various filtering methods to the reconstructed picture. The various filtering methods may include, for example, deblocking filtering, sample adaptive offset, adaptive loop filter, bilateral filter, and the like.

The (modified) reconstructed picture which has been stored in the DPB of the memory 360 may be used as a reference picture in the inter predictor 332. The memory 360 may store motion information of a block in the current picture, from which motion information has been derived (or decoded) and/or motion information of blocks in an already reconstructed picture.

In this specification, the examples described in the predictor 330, the dequantizer 321, the inverse transformer 322, and the filter 350 of the decoding apparatus 300 may be similarly or correspondingly applied to the predictor 220, the dequantizer 234, the inverse transformer 235, and the filter 260 of the encoding apparatus 200, respectively.

Figure 4:
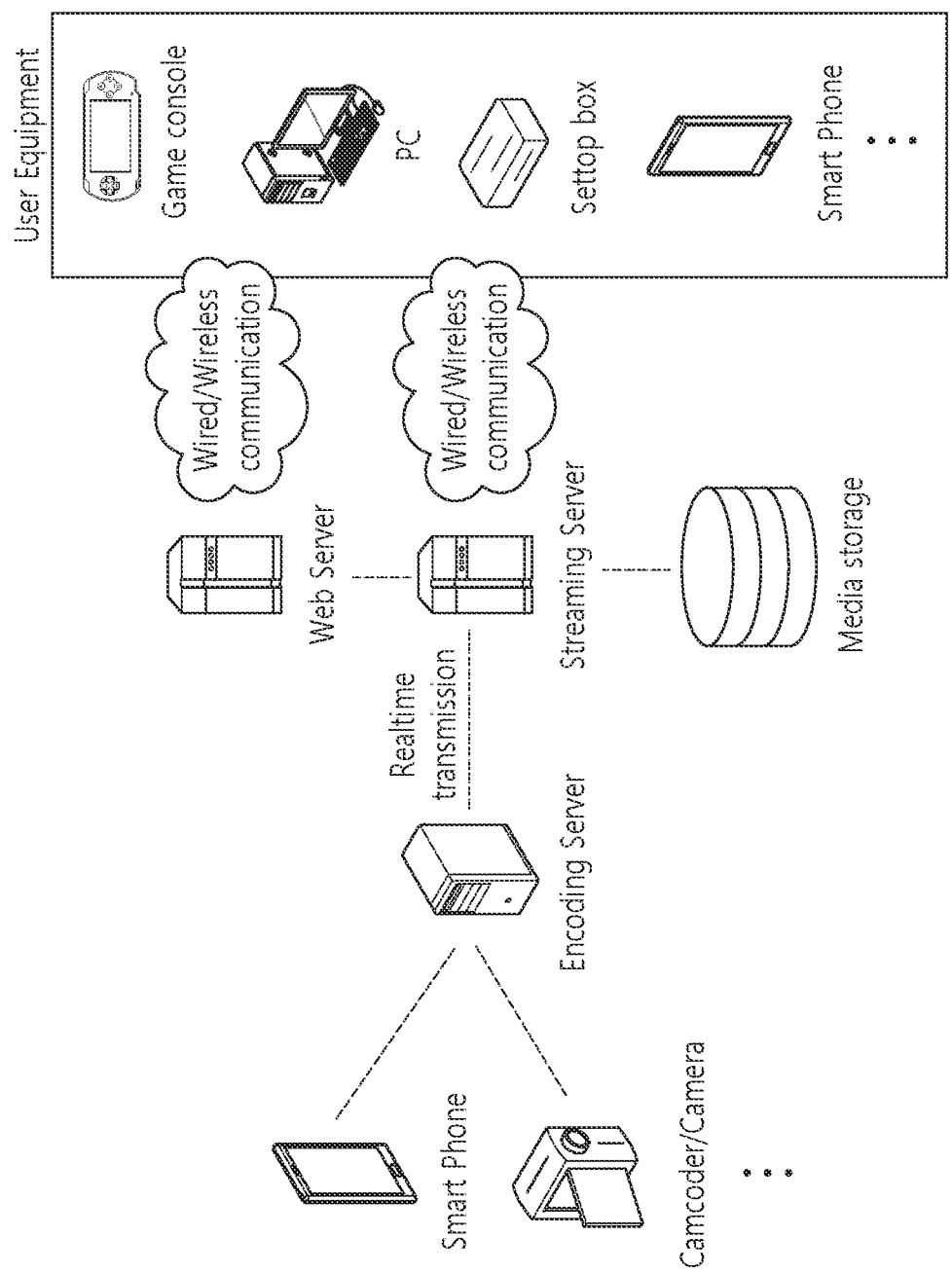
FIG. 4 exemplarily shows a structure diagram of a content streaming system to which this document is applied.

FIG. 4 exemplarily shows a structure diagram of a content streaming system to which this document is applied.

Further, the contents streaming system to which the present disclosure is applied may largely include an encoding server, a streaming server, a web server, a media storage, a user equipment, and a multimedia input device.

The encoding server functions to compress to digital data the contents input from the multimedia input devices, such as the smart phone, the camera, the camcoder and the like, to generate a bitstream, and to transmit it to the streaming server. As another example, in a case where the multimedia input device, such as, the smart phone, the camera, the camcoder or the like, directly generates a bitstream, the encoding server may be omitted. The bitstream may be generated by an encoding method or a bitstream generation method to which the present disclosure is applied. And the streaming server may store the bitstream temporarily during a process to transmit or receive the bitstream.

The streaming server transmits multimedia data to the user equipment on the basis of a user's request through the web server, which functions as an instrument that informs a user of what service there is. When the user requests a service which the user wants, the web server transfers the request to the streaming server, and the streaming server transmits multimedia data to the user. In this regard, the contents streaming system may include a separate control server, and in this case, the control server functions to control commands/responses between respective equipments in the content streaming system.

The streaming server may receive contents from the media storage and/or the encoding server. For example, in a case the contents are received from the encoding server, the contents may be received in real time. In this case, the streaming server may store the bitstream for a predetermined period of time to provide the streaming service smoothly.

For example, the user equipment may include a mobile phone, a smart phone, a laptop computer, a digital broadcasting terminal, a personal digital assistant (PDA), a portable multimedia player (PMP), a navigation, a slate PC, a tablet PC, an ultrabook, a wearable device (e.g., a watch-type terminal (smart watch), a glass-type terminal (smart glass), a head mounted display (HMD)), a digital TV, a desktop computer, a digital signage or the like. Each of servers in the contents streaming system may be operated as a distributed server, and in this case, data received by each server may be processed in distributed manner.

Meanwhile, the intra prediction mode may include non-directional (or non-angular) intra prediction modes and directional (or angular) intra prediction modes.

Figure 5:
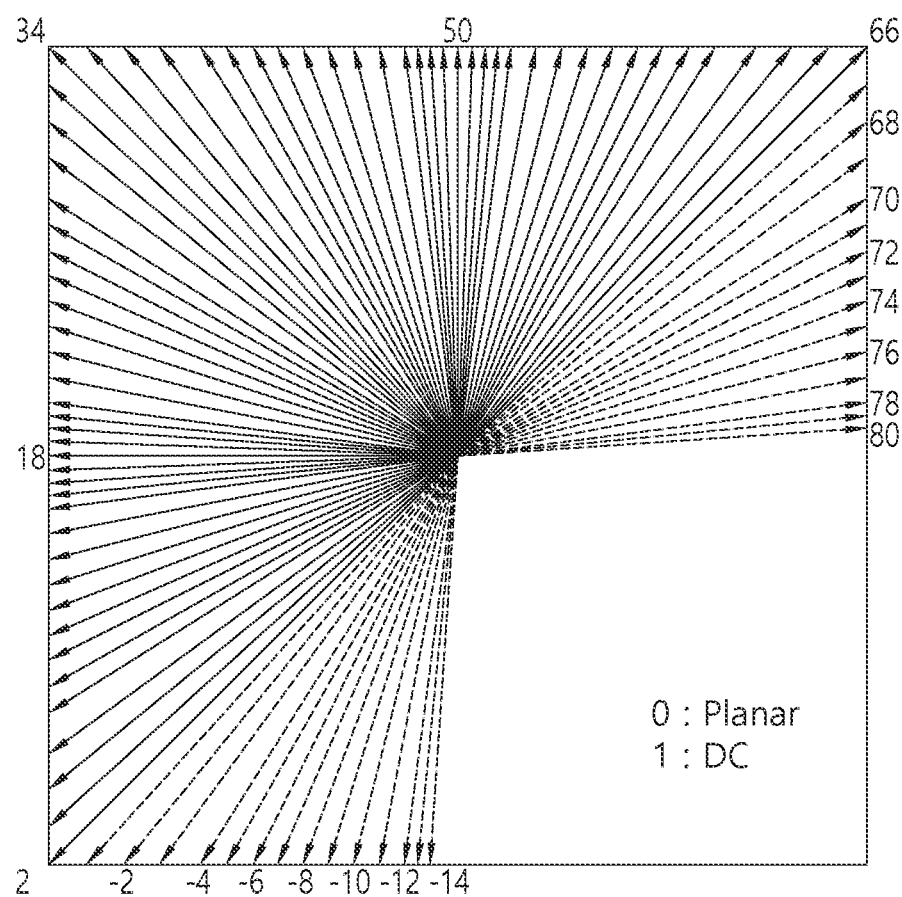
FIG. 5 illustratively shows intra-directional modes of 65 prediction directions.

FIG. 5 shows an example of intra prediction modes to which embodiments of the present document are applicable.

Referring to FIG. 5, centering on the 34th intra prediction mode having an upward-left diagonal prediction direction, an intra-prediction mode with horizontal directionality and an intra-prediction mode with vertical directionality can be distinguished. As shown in FIG. 5, intra prediction modes 2 to 33 have a horizontal direction, and intra prediction modes 34 to 66 have a vertical direction. The 18th intra prediction mode and the 50th intra prediction mode represent a horizontal intra prediction mode and a vertical intra prediction mode, respectively, the second intra prediction mode may be referred to as a downward-left diagonal intra prediction mode, the 34th intra prediction mode may be referred to as an upward-left diagonal intra prediction mode, and the 66th intra prediction mode may be referred to as an upward-facing diagonal intra prediction mode. The non-directional prediction mode may include a planar intra prediction mode of number 0 and a DC intra prediction mode of number 1.

Figure 6:
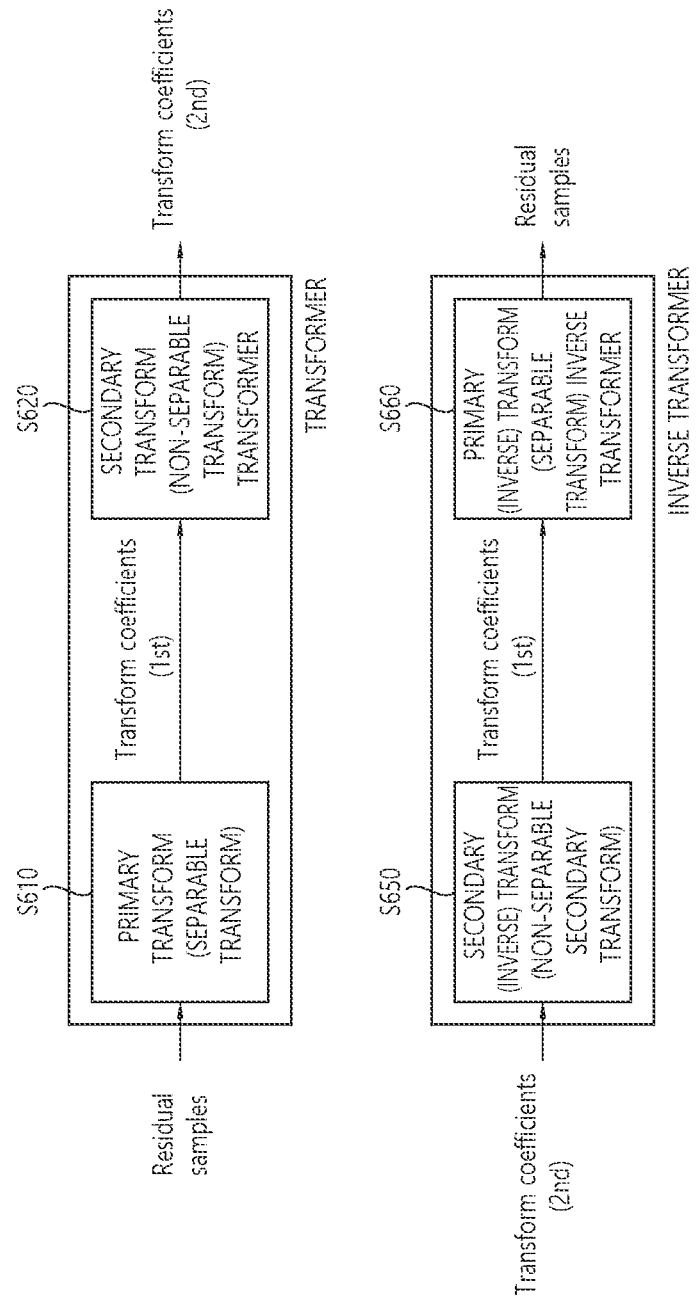
FIG. 6 schematically illustrates a conversion technique according to an embodiment of this document.

FIG. 6 schematically illustrates a conversion technique according to this document.

Referring to FIG. 6, a transformer may correspond to the transformer in the encoding apparatus of foregoing FIG. 2, and an inverse transformer may correspond to the inverse transformer in the encoding apparatus of foregoing FIG. 2, or to the inverse transformer in the decoding apparatus of FIG. 3.

The transformer may derive (primary) transform coefficients by performing a primary transform based on residual samples (residual sample array) in a residual block (S610). This primary transform may be referred to as a core transform. Herein, the primary transform may be based on multiple transform selection (MTS), and when a multiple transform is applied as the primary transform, it may be referred to as a multiple core transform.

The multiple core transform may represent a method of transforming additionally using discrete cosine transform (DCT) type 2 and discrete sine transform (DST) type 7, DCT type 8, and/or DST type 1. That is, the multiple core transform may represent a transform method of transforming a residual signal (or residual block) of a space domain into transform coefficients (or primary, transform coefficients) of a frequency domain based on a plurality of transform kernels selected from among the DCT type 2, the DST type 7, the DCT type 8 and the DST type 1. Herein, the DCT type 2, the DST type 7, the DCT type 8, and the DST type 1 may be called a transform type, transform kernel or transform core. These DCT/DST transform types can be defined based on basis functions.

When the multiple core transform is performed, a vertical transform kernel and a horizontal transform kernel for a target block may be selected from among the transform kernels, a vertical transform may be performed on the target block based on the vertical transform kernel, and a horizontal transform may be performed on the target block based on the horizontal transform kernel. Here, the horizontal transform may indicate a transform on horizontal components of the target block, and the vertical transform may indicate a transform on vertical components of the target block.

According to an example, if the primary transform is performed by applying the MTS, a mapping relationship for transform kernels may be set by setting specific basis functions to predetermined values and combining basis functions to be applied in the vertical transform or the horizontal transform. For example, when the horizontal transform kernel is expressed as trTypeHor and the vertical direction transform kernel is expressed as trTypeVer, a trTypeHor or trTypeVer value of 0 may be set to DCT2, a trTypeHor or trTypeVer value of 1 may be set to DST7, and a trTypeHor or trTypeVer value of 2 may be set to DCT8.

In this case, MTS index information may be encoded and signaled to the decoding apparatus to indicate any one of a plurality of transform kernel sets. For example, an MTS index of 0 may indicate that both trTypeHor and trTypeVer values are 0, an MTS index of 1 may indicate that both trTypeHor and trTypeVer values are 1, an MTS index of 2 may indicate that the trTypeHor value is 2 and the trTypeVer value. Is 1, an MTS index of 3 may indicate that the trTypeHor value is 1 and the trTypeVer value is 2, and an MTS index of 4 may indicate that both both trTypeHor and trTypeVer values are 2.

In one example, transform kernel sets according to MTS index information are illustrated in the following table.

TABLE 1

| | tu_mts_idx[ x0 ][ y0 ] | | | | |
|---|---|---|---|---|---|
| | 0 | 1 | 2 | 3 | 4 |
| trTypeHor | 0 | 1 | 2 | 1 | 2 |
| trTypeVer | 0 | 1 | 1 | 2 | 2 |

The transformer may derive modified (secondary) transform coefficients by performing the secondary transform based on the (primary) transform coefficients (S620). The primary transform is a transform from a spatial domain to a frequency domain, and the secondary transform refers to transforming into a more compressive expression by using a correlation existing between (primary) transform coefficients. The secondary transform may include a non-separable transform. In this case, the secondary transform may be called a non-separable secondary transform (NSST), or a mode-dependent non-separable secondary transform (MDNSST).

The non-separate secondary transform may refer to a transform that generates modified transform coefficients (or secondary transform coefficients) for a residual signal by secondary transforming the (first-order) transform coefficients derived through the primary transform based on a non-separable transform matrix. Here, based on the non-separate transformation matrix, it is possible to apply the transformation at once to the (primary) transformation coefficients without separately applying the vertical transformation and the horizontal transformation (or independently applying the horizontal and vertical transformation). For example, after rearranging 2-dimensional signals (conversion coefficients) into 1-dimensional signals through a specific predetermined direction (e.g., row-first direction or column-first direction), the non-separate secondary transform may derive modified transform coefficients (or secondary transform coefficients) based on a matrix operation of the one-dimensional vector and the non-separate transform matrix.

For example, the row priority order is to arrange the M×N block in the order of the 1st row, 2nd row, . . . , Nth row, the column priority order is to arrange in a row in the order of the 1st column, 2nd column, . . . , Mth column for M×N blocks. That is, for the non-separate secondary transform, the transform coefficient (derived through the primary transform) may be arranged into a 1D vector according to the row-major direction and then a matrix operation may be performed, or may be arranged into a 1-D vector according to the column-major direction and then a matrix operation is performed.

The non-separate secondary transform may be applied to a top-left region of a block composed of (primary) transform coefficients (hereinafter referred to as a transform coefficient block or a transform block). For example, when both the width (W) and height (H) of the transform coefficient block are 8 or more, an 8×8 non-separate secondary transform may be applied to an 8×8 region at the upper left of the transform coefficient block. In addition, when both the width (W) and height (H) of the transform coefficient block are 4 or more, and the width (W) or height (H) of the transform coefficient block is smaller than 8, a 4×4 non-separate secondary transform may be applied to the upper left min(8,W)×min (8,H) region of the transform coefficient block. However, the embodiment is not limited thereto, for example, even if only the condition that both the width (W) or height (H) of the transform coefficient block is 4 or more is satisfied, a 4×4 non-separate secondary transform may be applied to the upper left min(8,W)×min(8,H) region of the transform coefficient block. In summary, a non-separate secondary transform may be applied to an upper left 4×4 or 8×8 area of the transform block according to the size of the transform block. According to an example, a transformation for an upper left 4×4 area may be named a 4×4 transformation, and a transformation for an upper left 8×8 area may be referred to as an 8×8 transformation.

Here, to select a transform kernel, two non-separable secondary transform kernels per transform set for a non-separable secondary transform may be configured for both the 8×8 transform and the 4×4 transform, and there may be four transform sets. That is, four transform sets may be configured for the 8×8 transform, and four transform sets may be configured for the 4×4 transform. In this case, each of the four transform sets for the 8×8 transform may include two 8×8 transform kernels, and each of the four transform sets for the 4×4 transform may include two 4×4 transform kernels.

However, as the size of the transform, that is, the size of a region to which the transform is applied, may be, for example, a size other than 8×8 or 4×4, the number of sets may be n, and the number of transform kernels in each set may be k.

The transform set may be referred to as an NSST set or an LFNST set. A specific set among the transform sets may be selected, for example, based on the intra prediction mode of the current block (CU or subblock). A low-frequency non-separable transform (LFNST) may be an example of a reduced non-separable transform, which will be described later, and represents a non-separable transform for a low frequency component.

According to an example, the four transform sets according to the intra prediction mode may be mapped, for example, as shown in the following table.

TABLE 2

| predModeIntra | lfnstTrSetIdx |
|---|---|
| predModeIntra < 0 | 1 |
| 0 <= predModeIntra <= 1 | 0 |
| 2 <= predModeIntra <= 12 | 1 |
| 13 <= predModeIntra <= 23 | 2 |
| 24 <= predModeIntra <= 44 | 3 |
| 45 <= predModeIntra <= 55 | 2 |
| 56 <= predModeIntra <= 80 | 1 |

As shown in Table 2, any one of the four transform sets, that is, lfnstTrSetIdx, may be mapped to any one of four indexes, that is, 0 to 3, according to the intra prediction mode.

When it is determined that a specific set is used for the non-separable transform, one of k transform kernels in the specific set may be selected through a non-separable secondary transform index. An encoding apparatus may derive a non-separable secondary transform index indicating a specific transform kernel based on a rate-distortion (RD) check and may signal the non-separable secondary transform index to a decoding apparatus. The decoding apparatus may select one of the k transform kernels in the specific set based on the non-separable secondary transform index. For example, lfnst index value 0 may refer to a first non-separable secondary transform kernel, lfnst index value 1 may refer to a second non-separable secondary transform kernel, and lfnst index value 2 may refer to a third non-separable secondary transform kernel. Alternatively, lfnst index value 0 may indicate that the first non-separable secondary transform is not applied to the target block, and lfnst index values 1 to 3 may indicate the three transform kernels.

The transformer may perform the non-separable secondary transform based on the selected transform kernels, and may obtain modified (secondary) transform coefficients. As described above, the modified transform coefficients may be derived as transform coefficients quantized through the quantizer, and may be encoded and signaled to the decoding apparatus and transferred to the dequantizer/inverse transformer in the encoding apparatus.

Meanwhile, as described above, if the secondary transform is omitted, (primary) transform coefficients, which are an output of the primary (separable) transform, may be derived as transform coefficients quantized through the quantizer as described above, and may be encoded and signaled to the decoding apparatus and transferred to the dequantizer/inverse transformer in the encoding apparatus.

The inverse transformer may perform a series of procedures in the inverse order to that in which they have been performed in the above-described transformer. The inverse transformer may receive (dequantized) transformer coefficients, and derive (primary) transform coefficients by performing a secondary (inverse) transform (S630), and may obtain a residual block (residual samples) by performing a primary (inverse) transform on the (primary) transform coefficients (S640). In this connection, the primary transform coefficients may be called modified transform coefficients from the viewpoint of the inverse transformer. As described above, the encoding apparatus and the decoding apparatus may generate the reconstructed block based on the residual block and the predicted block, and may generate the reconstructed picture based on the reconstructed block.

The inverse transform unit may derive a modified transform coefficient by applying a transform kernel matrix to (inverse quantized) transform coefficients arranged according to a specific order, for example, a diagonal scan order (Specifically, the diagonal scan order starting from the upper left of the transform block and proceeding in the lower right direction). Modified transform coefficients may be two-dimensionally arranged in the upper left area of the transform block according to the direction in which transform coefficients are read for the secondary transform in the transform unit, that is, the row-first direction or the column-priority direction. When the 4×4 transform is performed by the transform unit, the inverse transform unit can arrange the modified transform coefficients in 2 dimensions in the 4×4 area of the transform block, when the 8×8 transform is performed by the transform unit, the inverse transform unit may align modified transform coefficients in 2 dimensions in the 8×8 region of the transform block.

Meanwhile, the secondary inverse transform may be NSST, reduced secondary transform (RST), or LFNST, and whether to apply the secondary inverse transform may be determined based on a secondary transform flag parsed from a bitstream. As another example, whether to apply the secondary inverse transform may be determined based on transform coefficients of the residual block.

This secondary inverse transform (that is, transform kernel, transform matrix, or transform kernel matrix) may be determined based on an LFNST (NSST or RST) transform set designated according to an intra prediction mode. Also, as an embodiment, the secondary transform determination method may be determined depending on the primary transform determination method. Depending on the intra prediction mode, various combinations of primary and secondary transforms may be determined. Also, for example, a region to which secondary inverse transform is applied may be determined based on the size of the current block.

On the other hand, as described above, when the secondary (inverse) transformation is omitted, residual blocks (residual samples) may be obtained by receiving (inverse quantized) transform coefficients and performing the first-order (separate) inverse transform. As described above, the encoding device and the decoding device may generate a reconstructed block based on the residual block and the predicted block and generate a reconstructed picture based on the residual block.

Meanwhile, in this document, a reduced secondary transform (RST) in which the size of a transform matrix (kernel) is reduced can be applied in the concept of NSST to reduce the amount of computation and memory required for non-separate secondary transform. In addition, since RST is mainly performed in a low-frequency region including non-zero coefficients in a transform block, it may be referred to as LFNST (Low-Frequency Non-Separable Transform). The conversion index may be named LFNST index.

In this specification, LFNST may mean a transform performed on residual samples of a target block based on a transform matrix having a reduced size. When the simplified transformation is performed, the amount of computation required for transformation may be reduced due to the reduction in the size of the transformation matrix. That is, LFNST can be used to solve the computational complexity issue that occurs when transforming a large block or non-separate transform.

On the other hand, when secondary inverse transform is based on LFNST, the inverse transformation unit 235 of the encoding device 200 and the inverse transformation unit 322 of the decoding device 300 may include an inverse RST unit for deriving modified transform coefficients based on the inverse RST of transform coefficients and an inverse primary transform unit for deriving residual samples for the target block based on inverse primary transform for modified transform coefficients. The inverse primary transform means an inverse transform of the primary transform applied to the residual. In this document, deriving a transform coefficient based on a transform may mean deriving a transform coefficient by applying a corresponding transform.

FIG. 7 is a diagram for explaining RST or LFNST to which RST is applied according to an embodiment of the present document.

In the present disclosure, a "target block" may refer to a current block to be coded, a residual block, or a transform block.

In the RST according to an example, an N-dimensional vector may be mapped to an R-dimensional vector located in another space, so that the reduced transform matrix may be determined, where R is less than N. N may mean the square of the length of a side of a block to which the transform is applied, or the total number of transform coefficients corresponding to a block to which the transform is applied, and the reduced factor may mean an R/N value. The reduced factor may be referred to as a reduced factor, reduction factor, simplified factor, simple factor or other various terms. Meanwhile, R may be referred to as a reduced coefficient, but according to circumstances, the reduced factor may mean R. Further, according to circumstances, the reduced factor may mean the N/R value.

The size of the reduced transform matrix according to an example may be R×N less than N×N, the size of a conventional transform matrix, and may be defined as in Equation 4 below.

$$T_{RxN} = \begin{bmatrix} t_{11} & t_{12} & t_{13} & \cdots & t_{1N} \\ t_{21} & t_{22} & t_{23} & & t_{2N} \\ \vdots & & & \ddots & \vdots \\ t_{R1} & t_{R2} & t_{R3} & \cdots & t_{RN} \end{bmatrix}$$ [Equation 1]

The matrix T in the Reduced Transform block shown in FIG. 7(a) may mean the matrix $T_{R\times N}$ of Equation 1. As shown in FIG. 7(a), when the reduced transform matrix $T_{R\times N}$ is multiplied to residual samples for the target block, transform coefficients for the target block may be derived.

In an example, if the size of the block to which the transform is applied is 8×8 and R=16 (i.e., R/N=16/64=¼), then the RST according to FIG. 7(a) may be expressed as a matrix operation as shown in Equation 2 below. In this case, memory and multiplication calculation can be reduced to approximately ¼ by the reduced factor.

In the present disclosure, a matrix operation may be understood as an operation of multiplying a column vector by a matrix, disposed on the left of the column vector, to obtain a column vector.

$$\begin{bmatrix} t_{1,1} & t_{1,2} & t_{1,3} & \cdots & t_{1,64} \\ t_{2,1} & t_{2,2} & t_{2,3} & & t_{2,64} \\ \vdots & & & \ddots & \vdots \\ t_{16,1} & t_{16,2} & t_{16,3} & \cdots & t_{16,64} \end{bmatrix} \times \begin{bmatrix} r_1 \\ r_2 \\ \vdots \\ \vdots \\ r_{64} \end{bmatrix}$$ [Equation 2]

In Equation 2, $r_1$ to $r_{64}$ may represent residual samples of the target block, and more specifically, may be transform coefficients generated by applying a primary transform. As a result of the operation of Equation 2, transform coefficients $c_i$ for the target block may be derived, and the process of deriving $c_i$ may be the same as Equation 3.

| for i from 1 to R: | Equation 3 |
|---|---|
| $c_i = 0$ | |
| for j from 1 to N: | |
| $c_i \mathrel{+}= t_{i,j} * r_j$ | |

As a result of the calculation of Equation 3, transform coefficients c1 to cR for the target block may be derived. That is, when R=16, transform coefficients c1 to c16 for the target block may be derived. If, instead of RST, a regular transform is applied and a transform matrix of 64×64 (N×N) size is multiplied to residual samples of 64×1 (N×1) size, then only 16 (R) transform coefficients are derived for the target block because RST was applied, although 64 (N) transform coefficients are derived for the target block. Since the total number of transform coefficients for the target block is reduced from N to R, the amount of data transmitted by the encoding apparatus 200 to the decoding apparatus 300 decreases, so efficiency of transmission between the encoding apparatus 200 and the decoding apparatus 300 can be improved.

When considered from the viewpoint of the size of the transform matrix, the size of the regular transform matrix is 64×64 (N×N), but the size of the reduced transform matrix is reduced to 16×64 (R×N), so memory usage in a case of performing the LFNST can be reduced by an R/N ratio when compared with a case of performing the regular transform. In addition, when compared to the number of multiplication calculations N×N in a case of using the regular transform matrix, the use of the reduced transform matrix can reduce the number of multiplication calculations by the R/N ratio (R×N).

In an example, the transformer 232 of the encoding apparatus 200 may derive transform coefficients for the target block by performing the primary transform and the RST-based secondary transform on residual samples for the target block. These transform coefficients may be transferred to the inverse transformer of the decoding apparatus 300, and the inverse transformer 322 of the decoding apparatus 300 may derive the modified transform coefficients based on the inverse reduced secondary transform (RST) for the transform coefficients, and may derive residual samples for the target block based on the inverse primary transform for the modified transform coefficients.

The size of the inverse RST matrix $T_{N\times R}$ according to an example is N×R less than the size N×N of the regular inverse transform matrix, and is in a transpose relationship with the reduced transform matrix $T_{R \times N}$ shown in Equation 1.

The matrix Tt in the Reduced Inv. Transform block shown in FIG. 7(b) may mean the inverse RST matrix $T_{R \times N}^T$ (the superscript T means transpose). When the inverse RST matrix $T_{R \times N}^T$ is multiplied to the transform coefficients for the target block as shown in FIG. 6(b), the modified transform coefficients for the target block or the residual samples for the current block may be derived. The inverse RST matrix $T_{R \times N}^T$ may be expressed as $(T_{R \times N})^T_{N \times R}$.

More specifically, when the inverse RST is applied as the secondary inverse transform, the modified transform coefficients for the target block may be derived when the inverse RST matrix $T_{R \times N}^T$ is multiplied to the transform coefficients for the target block.

Meanwhile, according to an example, inverse RST may be applied as an inverse primary transform. In this case, residual samples of the target block may be derived by multiplying the transform coefficients of the target block by the inverse RST matrix $T_{R \times N}^T$.

In one embodiment, when the size of the block to which the inverse transform is applied is 8×8 and R=16 (i.e., R/N=16/64=¼), the inverse RST according to (b) of FIG. 7 can be expressed as a matrix operation as shown in Equation 4 below.

$$\begin{bmatrix} t_{1,1} & t_{2,1} & \cdots & t_{16,1} \\ t_{1,2} & t_{2,2} & \cdots & t_{16,2} \\ t_{1,3} & t_{2,3} & \cdots & t_{16,3} \\ \vdots & & \ddots & \vdots \\ t_{1,64} & t_{2,64} & \cdots & t_{16,64} \end{bmatrix} \times \begin{bmatrix} c_1 \\ c_2 \\ \vdots \\ c_{16} \end{bmatrix}$$ [Equation 4]

In Equation 4, $c_1$ to $c_{16}$ may represent transform coefficients of the target block, that is, transform coefficients derived through residual coding. As a result of the operation of Equation 4, n representing modified transform coefficients of the target block or residual samples of the target block may be derived, and the derivation process of $r_i$ may be the same as Equation 5.

For i from 1 to N  Equation 5
 $r_i$=0
  for j from 1 to R
   $r_i$ +=$t_{ji}$ * $c_j$ As a result of the operation of Equation 5, $r_1$ to $r_N$ indicating modified transform coefficients of the target block or residual samples of the target block may be derived. Since N is 64 in Equation 4, 64 modified transform coefficients can be derived through Equation 5.

Considering the size of the inverse transformation matrix, the size of the normal inverse transform matrix is 64×64 (N×N), but the size of the simplified inverse transform matrix is reduced to 64×16 (N×R), compared to performing the normal inverse transform, the memory usage can be reduced by the R/N ratio when performing the inverse RST. In addition, compared to the number of multiplication operations N×N when using a normal inverse transformation matrix, using a simplified inverse transformation matrix, the number of multiplication operations can be reduced (N×R) by the R/N ratio. A simplified inverse transform matrix or inverse transform matrix may also be named a simplified transform matrix or a transform matrix if it is not confusing whether it is a transform or an inverse transform.

According to an embodiment of the present disclosure, for a transform in an encoding process, only 48 pieces of data may be selected and a maximum 16×48 transform kernel matrix may be applied thereto, rather than applying a 16×64 transform kernel matrix to 64 pieces of data forming an 8×8 region. Here, "maximum" means that m has a maximum value of 16 in an m×48 transform kernel matrix for generating m coefficients.

That is, when an RST is performed by applying an m×48 transform kernel matrix (m≤16) to an 8×8 region, 48 pieces of data are input and m coefficients are generated. When m is 16, 48 pieces of data are input and 16 coefficients are generated. That is, assuming that 48 pieces of data form a 48×1 vector, a 16×48 matrix and a 48×1 vector are sequentially multiplied, thereby generating a 16×1 vector. In this embodiment, the column vectors of Equation 2 are $r_1$ to $r_{48}$, the size of the transform matrix is 16×48, and 16 modified transform coefficients ($c_1$ to $c_{16}$) are derived through matrix operation.

Here, the 48 pieces of data forming the 8×8 region may be properly arranged, thereby forming the 48×1 vector. For example, a 48×1 vector may be constructed based on 48 pieces of data constituting a region excluding the bottom right 4×4 region among the 8×8 regions. Here, when a matrix operation is performed by applying a maximum 16×48 transform kernel matrix, 16 modified transform coefficients are generated, and the 16 modified transform coefficients may be arranged in a top-left 4×4 region according to a scanning order, and a top-right 4×4 region and a bottom-left 4×4 region may be filled with zeros.

In the inverse transformation of the decoding process, a transposed matrix of the transformation kernel matrix described above may be used. That is, when inverse RST or inverse LFNST is performed as an inverse transformation process performed by the decoding device, the input coefficient data to which inverse RST is applied is composed of a one-dimensional vector according to a predetermined arrangement order (diagonal scanning order), a modified coefficient vector obtained by multiplying a 1-dimensional vector by the corresponding inverse RST matrix from the left may be arranged in a 2-dimensional block according to a predetermined arrangement order.

If RST or LFNST is performed on the 8×8 area and inverse RST or inverse LFNST is performed for this, the size of the transformation matrix in Equation 4 is 48×16, the ten vectors are c1 to c16, through matrix operation, 48 modified transform coefficients ($r_1$ to $r_{48}$) are derived.

In summary, in the conversion process performed by the encoding device, when RST or LFNST is applied to an 8×8 area, a matrix operation is performed between 48 transform coefficients of the upper left, upper right, and lower left regions of the 8×8 region, excluding the lower right region of the 8×8 region, and a 16×48 transform kernel matrix. For matrix operation. 48 transform coefficients are input as a one-dimensional array. When this matrix operation is performed, 16 modified transform coefficients are derived, and the modified transform coefficients can be arranged in the upper left area of the 8×8 area.

Conversely, when inverse RST or LFNST is applied to the 8×8 area in the inverse transformation process performed by the encoding device or the decoding device, among the transform coefficients of the 8×8 domain, the 16 transform coefficients corresponding to the upper left of the 8×8 area may be input in the form of a one-dimensional array according to the scanning order and subjected to matrix operation with a 48×16 transform kernel matrix. That is, the matrix operation in this case can be expressed as (48×16 matrix)*(16×1 transform coefficient vector)=(48×1 modified transform coefficient vector). Here, since the n×1 vector can be interpreted in the same sense as an n×1 matrix, it can also be expressed as an n×1 column vector. Also, * means matrix multiplication operation. When this matrix operation is performed, 48 modified transform coefficients can be derived, 48 modified transform coefficients may be arranged in the upper left, upper right, and lower left areas of the 8×8 area, except for the lower right area.

The following drawings are made to explain a specific example of the present specification. Since the names of specific devices or names of specific signals/messages/fields described in the drawings are provided as examples, the technical features of the present specification are not limited to the specific names used in the drawings below.

In the following, various embodiments extending the LFNST described above are discussed.

Example 1: Method for Constructing a Region of Interest (ROI) Representing an Input Data Area Based on Forward LFNST Forward LFNST receives as input the transform coefficients to which the first transform is applied. In this case, instead of receiving all transform coefficients as inputs, transform coefficients belonging to a predefined specific region within the transform block may be received as inputs.

(a) of FIG. 8 shows an example of a forward LFNST input area in the VVC standard, and up to the third position in the scan sequence for a 4×4 subblock is set as the corresponding input area. Hereinafter, this input region, that is, the region of input transform coefficients input for the forward LFNST is referred to as Region Of Interest or ROI.

(b) of FIG. 8 shows that 4th to 6th subblocks are added to the ROI in the scan order of the 4×4 subblock shown in (a) of FIG. 8 to the ROI. That is, since the ROI is composed of six 4×4 sub-blocks, the ROI in (b) of FIG. 8 is composed of 96 samples based on the samples (transform coefficients to which the first transform is applied here). Compared to the ROI of (a) of FIG. 8 used for VVC, in case of (b) of FIG. 8, more primary transform coefficients can be considered in the LFNST. An extended LFNST (LFNST) based on such an extended ROI can provide higher encoding performance for a larger block (i.e., larger than or equal to 16×16) than the existing VVC LFNST.

When a non-separate transformation matrix is derived based on N samples belonging to the ROI, an N×N transformation matrix is derived when the corresponding transformation matrix is a square matrix. Here, when the R described with reference to FIG. 7 is applied for the reduced conversion, the R value may be equal to or smaller than N, the R value can be interpreted as the number of output transform coefficients derived by applying the LFNST from the perspective of the forward LFNST. Therefore, the dimension of the LFNST transformation kernel corresponding to (b) of FIG. 8 is not only 96×96, but also 16×96, 32×96, 48×6, 64×96, 80×96, etc. (In this example, it can be seen as a 16m×96 matrix (m≥1)). At this time, only cases in which the number of output conversion coefficients is a multiple of 16 are allowed, and the R value may be any positive integer equal to or smaller than N (i.e., 96). When generating an R×96 matrix from a 96×96 square matrix, it can be generated by sampling R rows from the 96×96 matrix based on the forward LFNST. If the rows constituting the 96×96 matrix are arranged in order of importance from the top, the R×96 matrix can be constructed by sequentially sampling R rows from the top.

The ROIs in (a) and (b) of FIG. 8 are composed of 48 and 96 input samples (input conversion coefficients or input data), respectively. The order of reading input samples in the ROI can be set in advance, but basically the order can be arbitrarily set. More specifically, when the forward LFNST matrix applied to an arbitrary ROI is an R×N matrix (i.e., the ROI consists of N input samples), even if it changes the order in which input samples are read, if it rearranges the N column vectors according to the changed order, Compared to before the change, the output value does not change regardless of the order of the input samples (the output value consists of R transform coefficients).

Meanwhile, for a specific forward LFNST transformation matrix (that is, assuming that the position of column vectors is fixed), the input samples constituting the ROI may be read in the order shown in FIG. 9 or FIG. 10 and configured as an input vector. FIG. 9 and FIG. 10 show the order of reading input data from ROI according to the intra prediction mode.

Figure 9A:
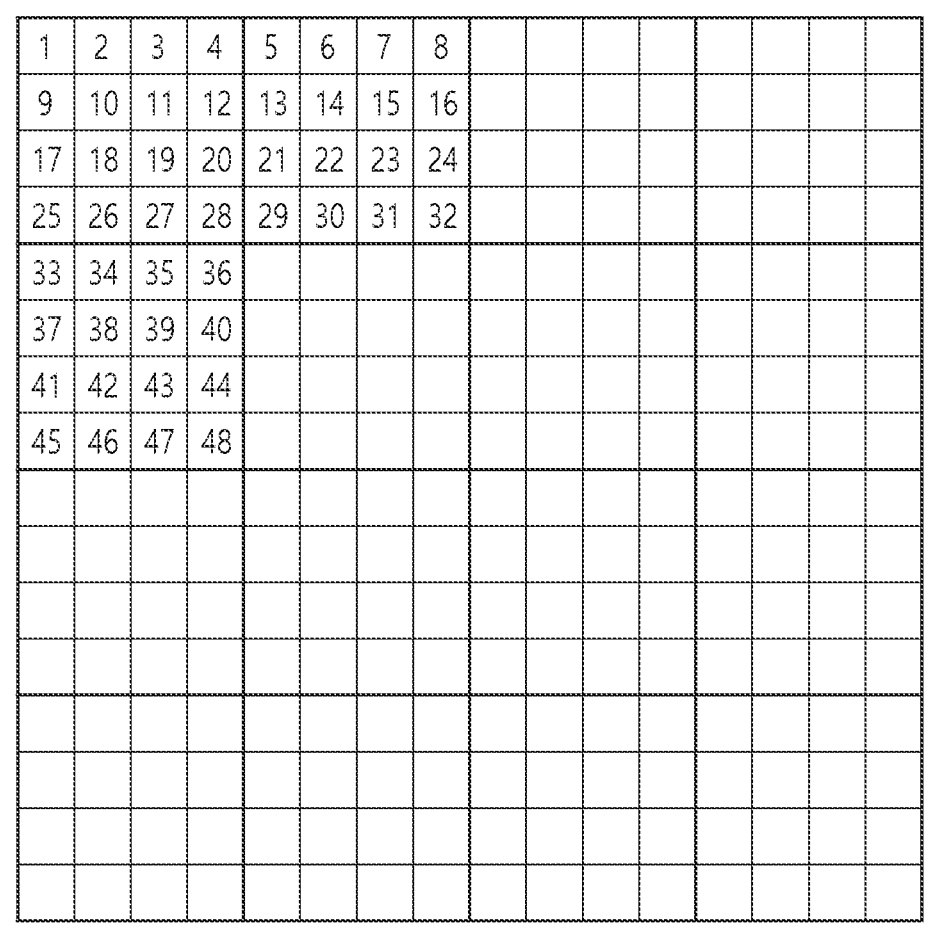
Figure 10A:
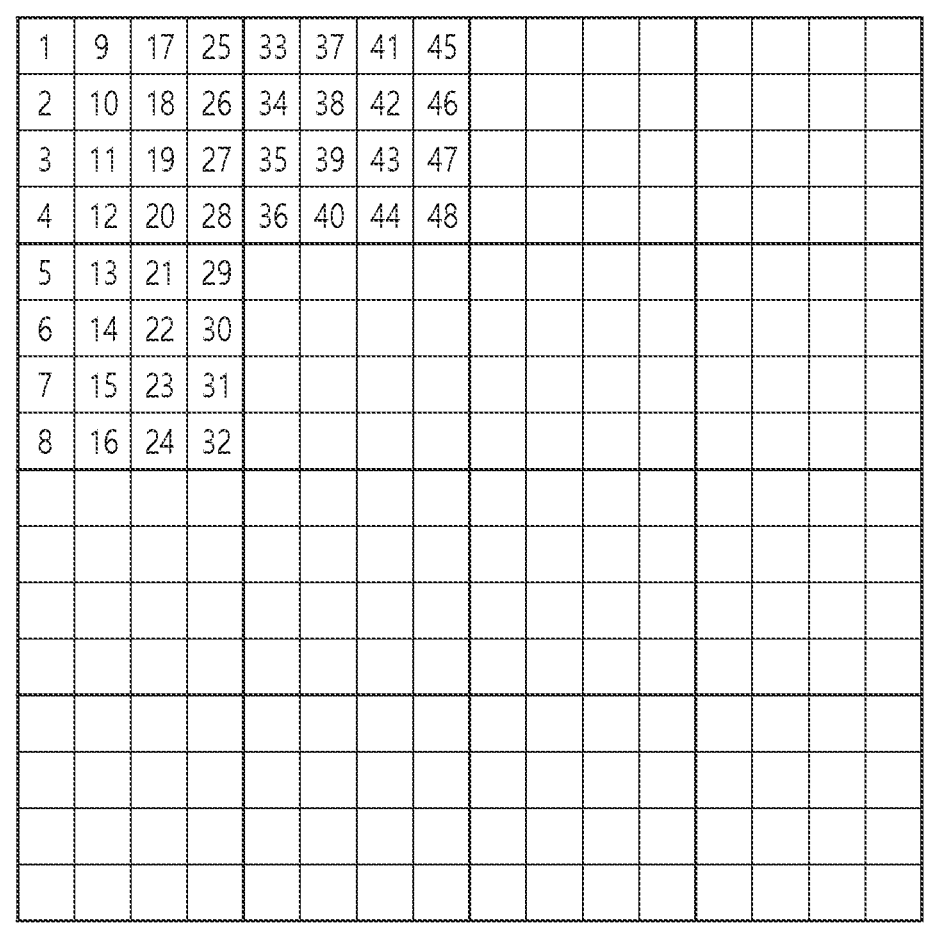

FIG. 9*a* and FIG. 10*a* correspond to (a) of FIG. 8, and FIG. 9*b* and FIG. 10*b* correspond to (b) of FIG. 8. If, like VVC LFNST, when applying symmetry centered on mode 34 for intra prediction modes, for modes −14 to −1 and 2 to 33 in FIG. 5, the row priority order is applied as shown in FIG. 9*a* and FIG. 9*b*, for modes 35 to 80, the column priority order of FIG. 10*a* and FIG. 10*b* can be applied. For modes 0, 1, and 34 indicating the planar mode and the DC mode, the order of FIG. 9*a* and FIG. 9*b* may be applied as it is, FIG. 9*a* and FIG. 9*b* or FIG. 10*a* and FIG. 10*b* may be applied for each mode.

As another example of the ROI, the upper left quadrangular region of the transform block may be set as the ROI. That is, in the M×N transform block, the upper left m×n (m≤M, n≤N) region can be set as the ROI, from the forward LFNST point of view, the number of input samples (transform coefficients after the first transform) is m×n. In a more specific embodiment, both m and n may be 8, and the dimension of the forward LFNST matrix may be R×64 (R is equal to or less than 64, examples of R values are 16, 32, 48, 64, etc.). A method of selecting R rows from an mn×mn square matrix (e.g., a 64×64 matrix) may be the same as the method of generating an R×96 matrix from a 96×96 described above.

Meanwhile, the ROI may not be composed of only 4×4 sub-blocks as shown in FIG. 8. In the VVC standard, a 4×4 subblock may correspond to a transform group (Coefficient Group, CG) for transform blocks to which LFNST may be applied, these CGs are not necessarily 4×4 sub-blocks. According to an example, the CG may be any predefined p×q sub block other than a 4×4 sub block. Even if a sub-block (CG) of a size other than the 4×4 sub-block is applied, regardless of the sub-block configuration, the order of reading the ROT input samples of the forward LFNST may follow a specific order determined as shown in FIG. 9*a* and FIG. 9*b* or FIG. 10*a* and FIG. 10*b*, transform coefficients output by the forward LFNST may be arranged according to the scan order of the corresponding CG and transform coefficients.

If the ROT is non-square (i.e. m≠n for the upper left area m×n), symmetry between intra prediction modes that are symmetric with respect to one M×N transform block (e.g., modes 24 and 44 as two symmetrical modes around mode 34) cannot be used. FIG. 11 is a diagram illustrating a non-square ROI according to an embodiment of the present document. As shown in (a) of FIG. 11, when the ROI is non-square, when reading input samples in a row-major direction and in a column-major direction, symmetry cannot be used because the phases of the transform coefficients are not aligned for both cases. In this case, two symmetric modes in one M×N block cannot share the LFNST kernel by using the symmetry of the prediction direction, however, between the M×N transform block and the N×M transform block, the symmetry of the intra prediction mode, which is symmetric about the 34th mode, can be utilized.

For example, as shown in (b) of FIG. 11, when the ROIs in the M×N block and the N×M block are the upper left m×n region and the n×m region, respectively, input samples can be read according to the order shown in (b) of FIG. 11 for modes 2 and 66. That is, for mode 2, input samples are read according to the left order of (b) of FIG. 11, for the 66th mode, input samples can be read according to the right order of (b) of FIG. 11. If the input samples are read by utilizing the symmetry of the two prediction modes in this way, the same LFNST kernel can be applied to the two ROIs in (b) of FIG. 11.

According to another example, ROIs with somewhat irregular shapes can also be applied to the LFNST. FIG. 12 is a diagram illustrating an irregularly shaped ROI according to an embodiment of the present document. As shown in (a) of FIG. 12, the ROI may be composed of lines having different lengths, as shown in (b) of FIG. 12, the ROI may be composed of segments of non-contiguous samples. When applying the forward LFNST, the LFNST kernel can be applied after constructing an input vector by collecting input samples according to the pattern shown in FIG. 12, when applying the inverse LFNST, outputs generated by multiplying the corresponding kernel matrix can be arranged according to the pattern shown in FIG. 12.

According to another example, the ROI may have a complex shape, such as having different lengths for each line or consisting of several segments for each line, rather than a 4×4 sub-block unit or simple rectangular shape as shown in FIG. 8. FIG. 13 is a diagram illustrating a 64-sample ROI having an irregular shape according to an embodiment of the present document, FIG. 14 is a diagram showing a 96-sample ROI having an irregular shape.

As shown in FIG. 13 and FIG. 14, the ROI has a complicated shape as shown in FIG. 12 compared to FIG. 8 and may be configured in a dense form centered on a DC position. The ROI shown in (a), (b), and (c) of FIG. 13 may consist of 64 locations (64 samples), the boundaries of the ROI are configured to be spaced apart by the same or similar length around the DC. ROIs consisting of 96 locations (96 samples) may be constructed in a similar manner as shown in FIG. 14. That is, as shown in FIG. 13 and FIG. 14, the ROI may be composed of transform coefficients within a specific boundary spaced apart by the same or similar length around the DC position.

Meanwhile, in the VVC standard, different LFNST kernels are applied according to the transform block size. That is, for a 4×4 transform block or a 4×N/N×4 (N≥8) transform block (a transform block whose horizontal and vertical lengths are both greater than or equal to 4 and the horizontal or vertical length is 4), an LFNST kernel having a 16×16 matrix form applicable to the upper left 4×4 region is applied (which can be named LFNST_4×4). Also, for transform blocks whose horizontal and vertical lengths are equal to or greater than 8, the ROT is composed of an upper left 4×4 subblock, a 4×4 subblock to the right of the upper left 4×4 subblock, and a 4×4 subblock adjacent to the lower side of the upper left 4×4 subblock. An LFNST kernel with a 16×48 matrix form is applied to the ROI based on the forward LFNST (can be named LFNST_8×8).

LFNST_4×4 and LFNST_8×8 each consist of 4 sets, each set consists of 2 conversion kernels, which set of kernels to apply is determined by the intra prediction mode. For the determined set, which of the two kernels to apply and whether to apply LFNST is specified through signaling of the LFNST index. If the LFNST index value is 0, LFNST is not applied, if it is 1, the first kernel is applied, and if it is 2, the second kernel is applied.

As described above, the LFNST structure in the VVC standard has been simplified and described, but there are also some exceptions. For example, for a 4×4 transform block and an 8×8 transform block, an 8×16 matrix and an 8×48 matrix sampled from the corresponding matrix are applied as forward LFNST, rather than a 16×16 matrix and a 16×48 matrix, respectively, when the MIP prediction mode is applied, the intra prediction mode is regarded as a planner mode and the LFNST set is determined.

Since the LFNST_4×4 and LFNST_8×8 are each composed of 4 LFNST sets, a bundle of LFNST sets named LFNST_4×4 or LFNST_8×8 may be represented by an LFNST set list for convenience of description below.

Meanwhile, in this document. LFNST_8×8 may indicate an LFNST set list applied to a transform block having a horizontal length or a vertical length of 8 with both horizontal and vertical lengths greater than or equal to 8, additionally, an LFNST set list applied to a transform block having both a horizontal length and a vertical length greater than or equal to 16 may be named LFNST_16×16.

Additional embodiments of matrix dimensions and ROIs that LFNST_4×4, LFNST_8×8, and LFNST_16×16 may have are as follows. In the following embodiment, the transformation matrix is based on when forward transformation is applied.

1. LFNST_4×4 can have a 16×16 matrix, and the ROI can be the upper left 4×4 area.
2. LFNST_8×8 can have an R×48 matrix or an S×64 matrix, and 16, 32, and 48 are possible as R values and 16, 32, 48, and 64 are possible as S values. The ROI for the R×48 matrix may be (a) of FIG. 8, and the ROI for the S×64 matrix may be an 8×8 area in the upper left corner.
3. LFNST_16×16 can have R×96 matrix or S×64 matrix or T×48 matrix, 16, 32, 48, 64, 80, 96 are possible as R values, 16, 32, 48, 64 are available as S values, T values of 16, 32, and 48 are possible. The ROI for the R×96 matrix may be (b) in FIG. 8 and the ROI for the S×64 matrix may be an 8×8 area in the upper left corner, and the ROI for the T×48 matrix may be (a) in FIG. 8.

As an architecture for LFNST_4×4, LFNST_8×8, and LFNST_16×16, any combination of matrix dimensions and ROI suggested in Nos. 1, 2, and 3 above is possible. For example, in the case of LFNST_4×4, the ROI of the upper left 4×4 area is applied to a 16×16 matrix, in the case of LFNST_8×8, the ROI of the upper left 8×8 area is applied to a 32×64 matrix, in the case of LFNST_16×16, the ROI shown in (b) of FIG. 8 may be applied to a 32×96 matrix.

In addition, if any one pair of LFNST_4×4, LFNST_8×8, and LFNST_16×16 has the same matrix dimension, it can share the LFNST set and LFNST kernel for that pair. For example, if the matrix dimension of LFNST_8×8 is 32×64 and the matrix dimension of LFNST_16×16 is 32×64, the same LFNST set list can be assigned to LFNST_8×8 and LFNST_16×16, and the same ROI can be set (for example, the ROI can be set to the upper left 8×8 area).

As another example, when the matrix dimension of LFNST_8×8 is 32×48 and the matrix dimension of LFNST_16×16 is 32×48, the same LFNST set list can be allocated to LFNST_8×8 and LFNST_16×16, and the same ROI can be set (for example, the ROI can be set as shown in (a) of FIG. 8).

On the other hand, when inverse LFNST is applied, when an input vector is constructed with R transform coefficients as input and the left side of the input vector is multiplied by an N×R matrix, N output samples (output transform coefficients) are generated. Here, the N×R matrix becomes a transposed matrix of the R×N matrix in the forward LFNST, and N output samples may be arranged in ROIs of FIGS. 8 to 14. When arranged in the ROI, the order shown in FIG. 9 or FIG. 10 may be followed according to the intra prediction mode value. For example, when utilizing symmetry between intra prediction modes, the row priority order of FIG. 9 is applied to intra prediction modes −14 to −1 and 2 to 33, the column priority order of FIG. 10 can be applied to modes 35 to 80. Regarding modes 0, 1, and 34, which indicate planar mode and DC mode, the order of FIG. 9a and FIG. 9b may be applied to all, or the order of FIG. 9a and FIG. 9b or FIG. 10a and FIG. 10b may be applied for each mode.

Example 2: Method for Constructing Output Data Based on Forward LFNST

In the VVC standard, the scan order for transform coefficients is hierarchically configured. There is a scan order of CGs and an internal scan order for each CG. FIG. 15 is a diagram showing the order of scanning these transform coefficients. As shown in FIG. 15, the scanning sequence proceeds in a diagonal direction from lower left to upper right. In FIG. 15, a small square represents one transform coefficient and a number inside the small square indicates a scan order.

If scanning from the lower left to the upper right once in CG units is one scan line, the first scan line consists of 1 CG and the second and third scan lines consist of two and three CGs, respectively, according to the same method, the Nth scan line is also composed of a plurality of CGs.

The ROIs shown in (a) of FIG. 8 and (b) of FIG. 8 are both composed of these CG-unit scan lines. (a) of FIG. 8 and (b) of FIG. 8 show an ROI composed of the first two and three scan lines, respectively, naturally, the ROI may consist of more scan lines.

As described above, when the number of output transform coefficients in the forward LFNST criterion is R and the number of input samples is N, R may be set less than or equal to N. In particular, as shown in FIG. 8, R may be set to a multiple of 16 (i.e., R=16k, k≥1). This is set so that the number of output transform coefficients of the forward LFNST is a multiple of the number of samples present in one CG, considering the case where the CG for the transform block to which the LFNST is applied is a 4×4 subblock. Therefore, if R is set to a multiple of 16, transform coefficients obtained by applying forward LFNST can be designed to be arranged only in specific 4×4 subblocks. Through this design, the residual coding part and the LFNST index signaling design can be further simplified.

For example, if a transform coefficient is parsed in a region other than a region in which the LFNST transform coefficient may exist, signaling of the LFNST index may be omitted and it may be inferred that the LFNST is not applied. Here, if an area where LFNST transform coefficients can exist is configured in units of 4×4 subblocks and residual coding is performed in units of corresponding 4×4 subblocks, it can be performed more simply to check whether a transform coefficient exists in an area other than the area where the LFNST transform coefficient can exist.

According to another embodiment, the CG may have a shape other than a 4×4 sub-block, and in this case (e.g. m×n block, m≠n), the R value may be set to a multiple of m×n. In addition, CGs in which forward LFNST output transform coefficients may exist may be composed of the first k CGs arranged according to the scanning order of the CGs.

Basically, the output coefficients of the forward LFNST can be arranged according to the transform coefficient scanning order. Since row vectors of the forward LFNST kernel are usually arranged from top to bottom in order of importance, assuming that the transform coefficients constituting the output vector are arranged in order from top to bottom (here, the output vector is assumed to be a column vector), coefficients can be arranged sequentially, starting with more significant coefficients. It is usually assumed that the order of scanning the transform coefficients is to scan from the most important coefficients, as the distance from the DC position is increased by scanning from the DC position indicated by the upper left position, conversion coefficients of less importance are arranged and mainly have a value of 0 or close to 0. Therefore, it may be advantageous in terms of coding performance to sequentially arrange the output transform coefficients of the forward LFNST according to the scan order starting from the DC position. Also, in many cases, the residual coding part is designed to increase coding efficiency when transform coefficients having 0 or values close to 0 frequently appear as the distance from the DC position increases.

Meanwhile, the output transform coefficients of the forward LFNST do not necessarily have to be arranged according to one fixed scan order. That is, according to another embodiment, the output transform coefficients of the LFNST may be sorted according to an order other than the scan order.

If it is statistically determined that a scan order other than the scan order in the VVC standard is suitable for the corresponding LFNST output coefficient, in the case where it is known in advance whether or not to apply the LFNST before performing the residual coding, a scan order specific to the LFNST may be applied instead of a previously determined scan order. In addition, when the optimal scan order varies depending on the coding context such as the intra prediction mode, according to an example, a different scan order may be applied to forward LFNST output transform coefficients for each intra prediction mode (or group of intra prediction modes).

Example 3: Method of Applying Various LFNST Set Lists/LFNST Sets/LFNST Kernels According to the Size of the Transform Block According to an example, unlike the LFNST set list, LFNST set, and LFNST kernel configuration per set in VVC (The LFNST kernel configuration per set here refers to which LFNST set consists of how many candidate kernels, etc.), the LFNST set list can be further subdivided and applied according to the size of the transform block.

For example, a different LFNST set list can be applied for every possible transform block shape (i.e., every possible M×N block), the corresponding set list may be expressed as, for example, LFNST_M×N. Alternatively, a corresponding LFNST set list may be applied to each group by grouping transform block shapes. In the case of the VVC standard, it can be seen that two types of LFNST set lists, namely LFNST_4×4 and LFNST_8×8, are applied by dividing into two groups according to the shape of the transform block. Examples of other groupings are as follows.

1. A separate group is set for cases where both the horizontal and vertical lengths of the transform block are equal to or greater than 16, and the LFNST set list applied to the group can be allocated. Here, the LFNST set list may be named LFNST_16×16. When combined with the grouping of the VVC standard, it can be divided into three groups as (Group 1) 4×4, 4×N/N×4 (N≥8) transform block, (Group 2) 8×8, 8×N/N×8 (N≥16) transform block, (Group 3) transform block with both width and height greater than or equal to 16, each group and/or the LFNST set list applied to the group may be named LFNST_4×4, LFNST_8×8, or LFNST_16×16.
2. In the grouping in No. 1 above, Group 1 can be further divided into 4×4 transform blocks and 4×N/N×4 (N≥8), it can be divided into Group 1A and Group 1B. Group 2 can also be divided into 8×8 transform blocks and 8×N/N×8 (N≥16) transform blocks, it can be classified as Group 2A and Group 2B. Also, Group 3 can be divided into Group 3A and Group 3B through a specific criterion. For example, 16×16 and 16×N/N×16 (N≥16) transform blocks may be set as Group 3A, and the remaining cases may be classified as Group 3B.

In addition, Group 1, Group 2, and Group 3 may or may not be divided into detailed groups as described above. For example, if only Group 1 and Group 3 are divided into detailed groups, all groups may be configured as Group 1A, Group 1B, Group 2, Group 3A, and Group 3B. Naturally, if Group 1, Group 2, and Group 3 are all divided, the groups can be classified as Group 1A, Group 1B, Group 2A, Group 2B, Group 3A, and Group 3B.

In addition to the above two embodiments, grouping can be applied according to various criteria based on the size of the transform block, a corresponding LFNST set list may be assigned to each group. This LFNST set list may be configured differently for each group.

For example, the number of kernels per LFNST set constituting the LFNST set list can be set differently (e.g. For Group 1, the number of LFNST kernels per set is 3, and for Group 2, the number of LFNST kernels per set is given, that is, for Group 1, the number of LFNST kernels constituting the set is set for every three sets, for Group 2, set the number of LFNST kernels that make up the set for every 2 sets), in more detail, the number of kernels constituting the set may be set differently for each LFNST set constituting one LFNST set list.

Alternatively, the number of LFNST sets included in each LFNST set list may be set differently, for example, Group 1 can consist of 18 LFNST sets and Group 2 can consist of 10 LFNST sets. Naturally, the dimension of the kernel matrix may be set differently according to the LFNST set list. Taking the VVC standard as an example, LFNST_4×4 consists of a 16×16 matrix and LFNST_8×8 consists of a 16×48 matrix.

More diversely, the dimension of the kernel matrix may beset differently for each LFNST set constituting the LFNST set list. A specific example of the detailed configuration of the LFNST set list is as follows.

1. Group 1 (LFNST_4×4) consists of 18 LFNST sets, and each LFNST set consists of 3 kernels, and the dimension of the corresponding kernel matrix may be 16×16. Group 2 (LFNST_8×8) consists of 18 LFNST sets, and each LFNST set consists of 3 kernels, and the dimension of the corresponding kernel matrix may be 16×48. Group 3 (LFNST_16×16) consists of 18 LFNST sets, and each LFNST set consists of 3 kernels, and the dimension of the corresponding kernel matrix may be 32×96.
2. In the configuration 1 above, all LFNST sets can be configured with 2 kernels instead of 3 kernels.
3. All LFNST set lists in the above configuration can be configured with a different number of sets than 18. For example, the LFNST set list may consist of 16, 15, 10, 6, or 4 transform sets.
4. In the first configuration, the dimensions of the kernel matrices constituting LFNST_8×8 may be set to 32×48 to 48×48.
5. In the first configuration, the dimensions of the kernel matrices constituting LFNST_16×16 may be set to one of 16×96, 48×96, 64×96, 80×96, and 96×96. Here, 96 represents the number of input samples (input transform coefficients) constituting the ROI in terms of the forward LFNST, and the ROI may be configured as shown in (b) of FIG. 8. If the ROI corresponding to LFNST_16×16 is configured as in (a) of FIG. 8 rather than (b) of FIG. 8, the dimensions of the kernel matrices constituting LFNST_16×16 may be set to one of 16×48, 32×48, and 48×48.
6. Based on No. 1 above, No. 2, No. 3, No. 4, and No. 5 above can be freely combined. For example, by applying number 3, the number of LFNST sets is set to 15, and by applying number 4, the dimensions of the kernel matrices constituting LFNST_8×8 may be set to 32×48.

Example 4: LFNST Application Method According to Color Component

In the VVC standard, when the tree type of a coding unit is a single tree, LFNST is applied only to the luma component, in the case of a separate tree, that is, a dual tree, LFNST is applied to the luma component in the case of a separate tree (dual tree luma) for the luma component, in the case of a separate tree (dual tree chroma) for chroma components, LFNST is applied to the chroma components.

Unlike the VVC standard, according to an embodiment, LFNST can be applied only to the luma component. If LFNST is applied only to the luma component, in a single tree, LFNST is applied only to the luma component and not to the chroma component, as in the VVC standard, the LFNST index indicates only the LFNST kernel applied to the luma component. If LFNST is applied only to the luma component, since LFNST does not apply when it is a split tree for chroma components, the LFNST index is also not signaled (If the LFNST index is not signaled, it may be assumed that the LFNST is not applied by default).

Alternatively, according to another embodiment, LFNST may be applied to both the luma component and the chroma component in the case of a single tree, unlike in the VVC standard. In this case, it can be implemented in two ways. That is, 1) image information is configured so that a corresponding LFNST kernel can be selected for both luma and chroma components by signaling one LFNST index, 2) image information may be configured such that individual LFNST indices are signaled for the luma component and the chroma component, so that the most appropriate LFNST kernel for each component may be selected.

When image information is configured such that the LFNST index is signaled individually for a luma component and a chroma component when a single tree is used, LFNST set lists, LFNST sets, and LFNST kernels for luma and chroma components can be configured differently.

In the case of a single tree, the LFNST set list, LFNST set, and LFNST kernel for luma and chroma components are set differently, when an LFNST kernel is selected for a luma component and a chroma component by signaling one LFNST index, the LFNST kernels for the luma component and the chroma component designated by one signaled LFNST index may be different because they are selected from different LFNST set lists and LFNST sets.

Meanwhile, in the VVC standard, the same LFNST set list is applied to luma and chroma components.

According to an embodiment, different LFNST set lists, different LFNST sets, and different LFNST kernels may be applied to the luma component and chroma component, unlike in the VVC standard. Alternatively, according to an embodiment, another LFNST set list, another LFNST set, or another LFNST kernel may be applied to all color components. For example, different LFNST set lists may be applied to Y, Cb, and Cr. Also, when other color formats are applied (e.g. YUV 4:2:2, YUV 4:4:4, RGB 4:4:4), different LFNST set lists, different LFNST sets, and different LFNST kernels may be applied to corresponding color formats. As a more specific example, in the case of an RGB 4:44 format, different LFNST set lists, different LFNST sets, and different LFNST kernels may be applied to R, G, and B components, respectively. Of course, the same LFNST set list, LFNST set, and LFNST kernel can be applied to the three components.

Meanwhile, the following describes the signaling method of the LFNST index according to various embodiments of this document.

According to one example, the DC ONLY condition of the LFNST index can be changed.

The DC ONLY condition means a condition in which the LFNST index is signaled only when a non-zero transform coefficient exists at a position other than the DC position even in one transform block for all transform blocks constituting one coding unit (CU) when ISP mode is not applied in the VVC standard. That is, if a non-zero transform coefficient exists at a position other than the DC position in at least one transform block among the plurality of transform blocks constituting one coding unit, the LFNST index may be signaled. On the other hand, for all transform blocks constituting a coding unit, if a non-zero transform coefficient exists only at the DC position or if a non-zero transform coefficient does not exist, the LFNST index is not signaled and the corresponding LFNST index value is inferred to be 0.

Generalizing these conditions, image information can be configured so that the LFNST index is signaled only when the y value satisfies a certain condition after passing a predetermined function $y=g(x)$ for the parsed transformation coefficient vector x.

The DC ONLY condition of the VVC standard can be expressed as a function condition as follows. $x_i$ represents the transform coefficient for position i within the transform block, assuming that $x_0$ represents the conversion coefficient at DC position, the parsed transformation coefficient vector x can be structured as $(x_0, x_1, \ldots, x_{n-1})$. The function $g(x)$ can be defined as a function that returns a value of 1 when there is at least one case where the transformation coefficient xi other than x0 is not 0, and returns 0 otherwise. That is, the y value can be 0 or 1, and the DC ONLY condition of the VVC standard corresponds to the condition of signaling the LFNST index only when at least one y value is 1 for all transform blocks.

Generalizing this, after applying a predetermined function $g(x)$ to each transform block constituting one coding unit, the calculated function return value y can be derived. Image information may be configured such that the LFNST index is signaled only when y values for all transform blocks satisfy certain preset conditions. The specific condition may be, for example, "all y values are greater than a certain threshold." Additionally, according to another example, the function $g(x)$ may have the form of a linear function or an affine function. That is, it can be constructed as $g(x)=x \cdot w+b$, where w and b represent arbitrary "coefficient vectors" and "offset vectors" respectively, and "·" can indicate the vector inner product.

According to another example, the LFNST index may be signaled before parsing the transform coefficients.

The LFNST index of the VVC standard is signaled after parsing of all transformation coefficients is completed. According to one example, image information may be configured so that the LFNST index is signaled before transform coefficient parsing. In this case, since the LFNST index value is identified before parsing the conversion coefficients, it is possible to know whether to apply LFNST before parsing the conversion coefficients. Since whether LFNST is applied is determined before transform coefficient parsing, transform coefficient parsing can be performed using the transform coefficient distribution when LFNST is applied, and coding performance for transform coefficient parsing can be improved.

As a more specific example, if the ROI for LFNST is the same as the VVC standard and all primary transformation coefficients outside the ROI area are zeroed out when LFNST is applied, the last non-zero transform coefficient position can be parsed by assuming that it is always located inside the upper left 4×4 area. For example, the maximum length of a truncated code can be limited or adjusted to be derived based on the upper left 4×4 area. Additionally, the conversion coefficient scan area may also be limited to the 4×4 area in the upper left corner.

Additionally, if the LFNST index is signaled after the last non-zero conversion coefficient position, if the location of the last non-zero conversion coefficient is outside the 4×4 area in the upper left corner, the LFNST index can be inferred as 0 without signaling.

The LFNST index can be signaled within the transformation unit (transform_unit) syntax table based on the VVC standard document. More specifically, the image information may be configured so that the LFNST index corresponding to the color component is parsed immediately after the conversion coefficient parsing for the color component to which LFNST is applied is completed. If, like the VVC standard, one coding unit is coded with a single tree structure and LFNST is applied only to the luma component, image information may be configured such that the LFNST index is signaled immediately after parsing of the transform coefficient for the luma component ends (before parsing the transform coefficient for the chroma component begins).

Considering the LFNST index signaling structures described above, the LFNST index signaling method may vary depending on the method of applying LFNST to each color component.

For example, if LFNST is applied only to the luma component regardless of the tree structure (i.e. single tree, split tree), in addition to the LFNST index signaling method of the VVC standard, a method of signaling the LFNST index before parsing the conversion coefficient for the luma component can be implemented. Additionally, image information may be configured such that the LFNST index is signaled inside the transform unit syntax table immediately after parsing the transform coefficient for the luma component.

If different LFNST indices are signaled to the luma component and chroma component in a single tree structure or a split tree structure (dual tree structure), and a different LFNST kernel is applied to each color component (As another example, if the color component consists of R, G. and B components, the image information can be configured so that different LFNST indices are signaled to the R, G, and B components), image information may be configured so that the LFNST index is signaled within the conversion unit syntax table immediately after the conversion coefficient parsing for each component is completed. Alternatively, the image information may be configured so that the corresponding LFNST index is signaled before parsing the transform coefficient for each color component.

Meanwhile, according to another embodiment of this document, whether to apply LFNST and the LFNST kernel are not determined only through direct signaling of the LFNST index, based on the restored transform coefficients or pixel values, whether LFNST is applied and the LFNST kernel applied to LFNST can be inferred.

In this embodiment of signaling the LFNST index based on the restored transform coefficients or pixel values, let us assume that it is known in advance that MTS is not applied according to one example.

In the VVC standard, the MTS index is signaled after the LFNST index, so it is not 100% known whether MTS is applied at the time of signaling the LFNST index. On the other hand, if the MTS index is signaled first, whether MTS is applied can be 100% known at the time of signaling the LFNST index. If it is known in advance that MTS is not applied or DCT-2 is applied as the first transformation, LFNST can be applied in the VVC standard.

In this case, there are three cases that will be described later, and the residual block can be restored in advance for each case.

(1) When restoring by applying only inverse DCT-2 without applying inverse LFNST
(2) When restoring by applying the first inverse LFNST kernel and inverse DCT-2
(3) When restoring by applying the second inverse LFNST kernel and inverse DCT-2

If there are three or more LFNST kernel candidates to select from, the number of cases increases as the number of added LFNST kernel candidates. For example, a case of restoration by applying a third inverse LFNST kernel and inverse DCT-2 may be added.

For the above three cases, the residual block obtained by applying the inverse transform (applying the inverse LFNST and then applying the inverse linear transform, or applying only the inverse linear transform) can be added to the prediction block to generate a restored block. Then, the continuity or similarity with the surrounding reference reconstruction pixels can be measured to derive a metric value indicating the degree of continuity or similarity.

According to one example, the case where the metric value is the largest may be selected, or conversely, the case where the metric value is the smallest may be selected by measuring discontinuity or difference.

As a more specific example, the difference between neighboring reference restored pixel values adjacent to the current transform block and the left boundary pixel or upper boundary pixel within the current transform block may be calculated and the sum of the values may be set as the corresponding metric value. The image information can be configured so that the case with the smallest corresponding metric value is selected among the three cases above.

To express this symbolically, the left adjacent reference restored pixel values of the current transform block are defined as $RL_0, RL_1, \ldots, RL_{H-1}$ from top to bottom (H is the height of the current transform block), the left boundary restoration pixel values within the current conversion block can be defined as $CL_0, CL_1, \ldots, CL_{H-1}$ from top to bottom. The sum of the difference values at the left border of the current block can be calculated as SL which is the sum of $|CL_i - RL_i|$ (i=0, 1, ..., H−1). Define the upper adjacent reference reconstruction pixel values of the current transform block as $RU0, RU1, \ldots, RUW-1$ from left to right (W is the width of the current transform block), when defining the upper boundary restoration pixel values within the current conversion block as $CU0, CU1, \ldots, CUW-1$ from left to right, the sum of the difference values at the upper boundary of the current block can be calculated as SU which is the sum of $|CU_i - RU_i|$ (i=0, 1, ..., W−1). At this time, the SL+SU value can be set as a metric value.

According to one example, a residual reconstruction block without adding a prediction block may be used as is to derive a metric value. When using the residual block obtained by applying the inverse transform, the residual block can be obtained by applying the inverse LFNST and then the inverse linear transform, or it can be derived by applying only the inverse linear transform. In this case, rather than calculating the difference with the surrounding reference restored pixels, the sum of the absolute values of the residual restored data at the left and upper boundaries within the current transform block can be set as a metric value. At this time, the case where the metric value is the smallest may be selected. If the intra prediction mode is applied properly, since predictions at the left and upper boundaries are better than at the center of the current block, the absolute value of the residual data at the left and upper boundaries may be less than the absolute value of the residual data at the center.

If expressed more specifically symbolically, it is as follows. When defining the left boundary residual value within the current conversion block as $CL_0, CL_1, \ldots, CL_{H-1}$ from the top of the current conversion block to the bottom (H is the height of the current conversion block), the sum of the absolute values of the residual data at the left boundary of the current transform block can be calculated as SL, which is the sum of $|CL_i|$ (i=0, 1, ..., H−1). When defining the upper boundary residual value within the current transform block as $CU_0, CU_1, \ldots, CU_{W-1}$ from left to right of the current transform block (W is the width of the current transform block), the sum of the absolute values of the residual data at the upper boundary of the current transform block can be calculated as S U, which is the sum of $|CU_i|$ (i=0, 1, ..., W−1). The SL+SU value is set as a metric value, and the case where the SL+SU value is the smallest may be selected.

For the above two types of metrics, if the intra prediction mode is close to the horizontal direction (Based on the directional mode in the VVC standard, it can be modes from −14 to −1 and modes from 2 to 34, mode 34 may or may not be included in the horizontal orientation mode.), the SL value can be set as a metric value. Additionally, if the intra prediction mode is close to the vertical direction (Based on the directional mode in the VVC standard, it can be modes 34 to 66, modes 67 to 80, mode 34 may or may not be included in the vertical mode.), the SU value can be set as a metric value. For the remaining intra prediction modes (0, 1, or 34), the SL+SU value can be applied as a metric value.

According to another example, an example of a continuity or similarity metric may be the number of boundary residual pixels within the current block that have the same sign (i.e., both positive or negative) as residual pixels adjacent to the current transform block. More specifically, the number of pixels whose residual values have the same sign can be counted for both the left boundary and the upper boundary.

The candidate (one of the three cases) selected through the above-described metric value can be applied to the conversion as is, and in this case, LFNST index signaling does not occur.

Alternatively, the LFNST kernel may be designated through additional signaling based on the selected candidate. If the second of the three cases (That is, (1) when restoring by applying only inverse DCT-2 without applying inverse LFNST, (2) When restoring by applying the first inverse LFNST kernel and inverse DCT-2, (3) restoration by applying the second inverse LFNST kernel and inverse DCT-2) is selected through the metric value, LFNST is applied and the LFNST method can be determined by applying the first LFNST kernel.

When adding LFNST index signaling, the following embodiments are possible.

1. If the first case (case (1)) is selected, LFNST is considered not to apply and separate LFNST index signaling may not be performed. If the second or third case (Case (2) or Case (3)) is selected, LFNST is assumed to apply, and by signaling a bit (or flag) to select one of the first LFNST candidate and the second LFNST candidate, among the LFNST candidates, the LFNST kernel can be finally selected.
2. After sorting the cases according to the metric value, existing LFNST index signaling can be applied to the sorted cases. If the smaller the metric value, the more likely the candidate is due to higher continuity or similarity, the three cases can be sorted in ascending order of the metric value. Conversely, if the larger the metric value, the more likely the candidate is, the three cases can be sorted in descending order of the metric value.

For example, if there are a total of three possible cases (For the VVC standard, it is possible for cases where LFNST is not applied, when the first LFNST kernel is applied, and when the second LFNST kernel is applied). LFNST index values can be 0, 1, or 2, and candidates sorted by metric values can be given LFNST index values of 0, 1, or 2 starting from the highest priority. If there are more than three possible cases (for example, when the number of LFNST kernel candidates is more than two), the candidates sorted by metric values can be given priorities starting from 0 as LFNST index values.

In the case of the VVC standard, since truncated unary code is applied as the binary code for the LFNST index, for smaller LFNST index values, shorter binary codes can be assigned to reduce signaling costs. That is, as the LFNST index value is smaller, a shorter-length binary code is assigned, so a shorter-length code can be assigned to a more likely (higher possibility) candidate.

3. Sorting possible cases according to metric values is the same as in number 2, but only cases with higher priority can be partially selected among them. For example, among the N cases obtained by sorting the metric value in ascending (descending) order, n (n≤N) can be selected in descending order (large order) of the metric value. One of these can be selected through separate LFNST index signaling. As a more specific example, if a total of three cases are possible, the three cases are sorted according to the metric value, among them, only two cases with high priority can be selected. Video information can be configured so that one of the two cases is selected by signaling one bit or flag as an LFNST index.

According to one example, when it is known in advance which MTS kernel will be applied through MTS index signaling, etc., whether to apply LFNST can be determined based on the metric value.

If it is known which MTS kernel will be applied, the corresponding metric value can be obtained in the same manner as above by constructing restored data by adding residual data or prediction blocks for the corresponding MTS kernel. For example, if the metric value is smaller than when LFNST is applied after calculating the sum of the absolute values of the restored residual data for the left and upper boundary positions within the current transform block, LFNST may not be applied. Of course, if LFNST is not applied to primary transformations other than DCT-2, the process of inferring which LFNST candidate to apply when a kernel other than DCT-2 is applied is meaningless.

Meanwhile, according to another embodiment, the LFNST index value can be inferred regardless of MTS index signaling.

For example, restoration residual data can be derived for the first LFNST kernel and the second LFNST kernel. Here, if other linear transformations other than DCT-2 and combinations with LFNST are possible, the number of cases to be tried increases accordingly. By applying the inverse linear transformation after applying the inverse LFNST, the corresponding restored residual data can be derived. When the residual data is derived, the sum of the absolute values of the restored residual data for the left and upper boundary positions within the current transform block is calculated, the smaller value can be selected among the sum of the absolute values of the restored residual data for the two LFNST kernel candidates. By comparing the selected value with a specific threshold, it can be inferred that LFNST is applied if the selected value is less than the threshold, conversely, if the selected value is greater than the threshold, it can be inferred that LFNST is not applied.

If a primary transform other than DCT-2 is applied when LFNST is applied, the sum of the absolute values of the restored residual data for all combinable primary transforms for one LFNST kernel can be derived. The smallest value among the sums of absolute values derived for each primary transformation can be selected as the representative value for the corresponding LFNST kernel.

In practice, the process of inferring the above-described LFNST index value (or the process of inferring whether to apply LFNST and which LFNST kernel to apply) can be carried out regardless of the MTS index value.

In other words, even if LFNST can be applied only when there is a certain MTS index value (For example, in the VVC standard, LFNST can only be applied for cases where DCT-2 transformation is applied), the above-described LFNST index value inference process can be applied.

On the other hand, there are cases where the MTS index is parsed or inferred and the MTS index value is identified, and LFNST cannot be applied to the primary transformation corresponding to the identified MTS index value. In this case, the LFNST index value obtained through inference of the LFNST index value (i.e., whether LFNST is applied and LFNST kernel information) becomes meaningless, so the video information can be configured so that the corresponding LFNST index value does not affect the decoding operation. If the primary transformation corresponding to the parsed or inferred MTS index value and LFNST can be applied together, the LFNST application status and LFNST kernel information derived through the inference process are valid.

Below, according to an embodiment of this document, zero-out applied to LFNST is described.

When the conversion coefficient derived by applying forward LFNST is named the LFNST conversion coefficient, basically, if a conversion coefficient is found in an area where an LFNST conversion coefficient cannot exist, it is certain that LFNST has not been applied, so the LFNST index is not signaled and is inferred as a value of 0. Conversely, if a transform coefficient is not found (does not exist) in an area where an LFNST transform coefficient can exist, there is a possibility that LFNST has been applied, and the LFNST index is signaled. The signaled LFNST index value may be 0 or a value greater than 0. At this time, a value of 0 may indicate that LFNST is not applied, and a value other than 0 may indicate that LFNST is applied. For example, if n is a non-zero value, n can represent the nth LFNST kernel candidate. Here, the LFNST kernel candidate may be one of a plurality of LFNST kernels constituting the LFNST set selected through intra prediction mode, etc.

When LFNST is applied in the VVC standard, primary transform coefficients to which forward LFNST is not applied (i.e., primary transform coefficients that do not belong to the ROI) are also zeroed out. Therefore, when forward LFNST is applied in LFNST according to the VVC standard, there are no non-zero transform coefficients except for the upper left 4×4 area in the transform block. In the case of a 4×4 transform block and an 8×8 transform block, a non-zero transform coefficient may exist only up to the 8th position in the scan order even within the 4×4 area in the upper left.

According to an example in this document, unlike the VVC standard, all primary transform coefficients to which forward LFNST is not applied are not zeroed out, and zeroing out can be applied differently depending on specific conditions. Below, these application examples are described.

1. Depending on the size of the transform block, the zero-out area of the primary transform coefficient can be set differently.

For example, if the size of the transform block is large, all areas other than the ROI area to which forward LFNST is applied may not be zeroed out, and some areas close to or adjacent to the ROI may not be zeroed out.

When defining coordinates using the 4×4 sub-block area as the unit, the 4×4 sub-block area located in the upper left corner can be expressed as (x coordinate, y coordinate) being (0, 0), this can be set so that the x and y coordinates increase from left to right and from top to bottom, respectively. In this coordinate notation, the coordinates of the 4×4 subblock adjacent to the right from the upper left 4×4 subblock are expressed as (1, 0), the coordinates of the 4×4 subblock adjacent to the bottom from the upper left 4×4 subblock can be expressed as (0, 1).

In this way, when coordinates in units of 4×4 subblocks are assigned to all 4×4 subblocks within the transform block, the ROI for the LFNST of the VVC standard consists of 4×4 sub-block areas indicated by (0, 0), (1, 0), and (0, 1) coordinates. At this time, the primary transform coefficients present in the 4×4 sub-blocks except for three sub-blocks can be considered to be all zeroed out when LFNST is applied.

On the other hand, according to one example, if the size of the transform block is equal to or larger than M×N (here, equal to or larger than M×N block means that the width and height are larger than or equal to M and N, respectively), without zeroing out all primary transform coefficients for the ROI area, the primary transform coefficients belonging to the 4×4 sub-block areas indicated by (2, 0), (1, 1), and (0, 2) may not be zeroed out. That is, for 4×4 sub-blocks where the sum of the x and y coordinates is 2, image information can be configured so that the primary transform coefficients are not zeroed out. Here, M and N can each be 16.

FIG. 16 is a diagram to explain zero out of the primary transform coefficient according to an embodiment of this document.

As described above, the zero out area of the primary transform coefficient can be configured differently depending on the size of the transform block. For example, when the transform block is larger than an 8×8 block, as shown in (a) of FIG. 16 (That is, if both the horizontal and vertical lengths are greater than or equal to 8, and at least one of the horizontal and vertical lengths is greater than 8), the ROI can be up to the second diagonal CG (Coefficient Group, which can be viewed as a 4×4 sub-block), up to the sub-blocks belonging to the third diagonal CG line (that is, until the sum of the x-coordinate and y-coordinate is 0 to 2 based on the coordinates of the 4×4 subblock unit), the primary transform coefficient may not be zeroed out. Areas after sub-blocks belonging to the third diagonal CG line may be zeroed out. According to one example, the zero-out method of the primary transform coefficient performed when applying LFNST in the VVC standard may be applied to transform blocks other than those where the transform block is larger than an 8×8 block.

In summary, in the LFNST of the VVC standard, for LFNST_8×8, that is, for the forward LFNST applied to a transform block whose horizontal and vertical lengths are both greater than or equal to 8, based on the scan order for the 4×4 subblock, the primary transform coefficient can exist only up to the second diagonal CG line. In other words, when backward LFNST was applied, the primary transform coefficient could exist only in the corresponding ROI.

According to an example in this document, the primary transform coefficient may not be zeroed out until the third CG line along the diagonal direction, as shown in (a) of FIG. 16. According to the coordinate notation method defined earlier, when x-coordinates and y-coordinates are defined in units of 4×4 subblocks, in the VVC standard, the primary transform coefficient can exist only when the sum of the x-coordinates and y-coordinates is from 0 to 1. Since the area where the sum of x and y coordinates is 0 to 1 corresponds to the ROI of LFNST_8×8, from the decoder's perspective, it corresponds to the area where the primary transform coefficient is restored when inverse LFNST is applied. According to (a) of FIG. 16, primary transform coefficients can exist even when the sum of the x coordinate and y coordinate is 2, that is, when LFNST is applied, image information can be configured so that the primary transform coefficients are zeroed out only when the sum of the x-coordinate and y-coordinate is 3 or more.

Alternatively, as shown in (b) of FIG. 16, the primary transform coefficient may not be zeroed out until the fourth CG line along the diagonal direction. According to the coordinate notation defined previously, the area where the sum of the x and y coordinates is 0 to 3 may be the ROI of LFNST_16×16, from the decoder's perspective, it corresponds to the area where the primary transform coefficient is restored when inverse LFNST is applied. According to (b) of FIG. 16, primary transform coefficients can exist even when the sum of the x coordinate and y coordinate is 3, that is, when LFNST is applied, image information can be configured so that the primary transform coefficients are zeroed out only when the sum of the x-coordinate and y-coordinate is 4 or more.

Generalizing the above embodiment, if the size of the transform block is equal to or larger than M×N, except for the ROI for LFNST, the primary transform coefficient may not be zeroed out for the 4×4 subblock area where the sum of the x and y coordinates is equal to or smaller than S for the remaining areas. Here the S value can be 2, 3 or 4.

Meanwhile, in the VVC standard, in the case of LFNST_4×4 (if it is an LFNST set list applied to a transform block with a horizontal or vertical length of 4), LFNST transform coefficients can exist only in the upper left 4×4 subblock. Here, the LFNST transform coefficient refers to the transform coefficient generated after applying forward LFNST to the ROI. When LFNST_4×4 is applied, based on the coordinates of the 4×4 subblock unit, the primary transform coefficient of the subblock whose x-coordinate and y-coordinate sum is greater than 0 is zeroed out.

According to one example, the primary transform coefficient may not be zeroed out until the second diagonal CG line. In other words, the primary transform coefficient can be allowed to exist until the sum of the x-coordinate and y-coordinate is 1. At this time, for a 4×N block, a primary transform coefficient may also exist in the 4×4 subblock for (0, 1), for N×4 blocks, primary transform coefficients may also exist in the 4×4 subblock for (1, 0).

Figure 17:
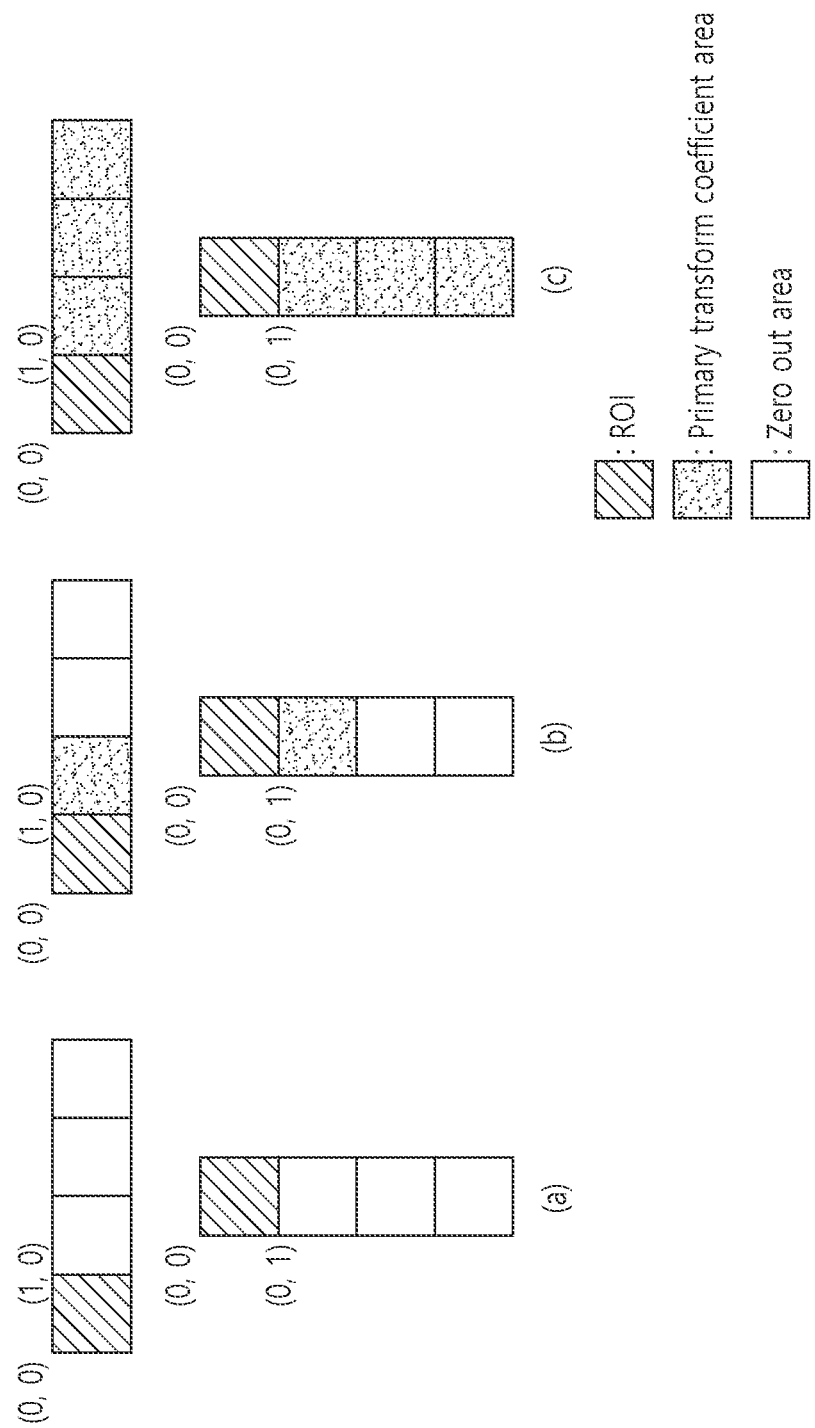
FIG. 17 is a diagram to explain zero out of the primary transform coefficient according to another embodiment of this document.

FIG. 17 is a diagram to explain zero out of the primary transform coefficient according to another embodiment of this document.

(a) of FIG. 17 shows zero out applied to LFNST_4×4 in the existing VVC standard, (b) of FIG. 17 shows that the 4×4 subblock for (0, 1) is not zeroed out and primary transform coefficients remain according to the above embodiment.

Meanwhile, as shown in (c) of FIG. 17, when LFNST_4×4 is applied, all primary transform coefficients may not be zeroed out. In other words, for a 4×N/N×4 (N≥4) transform block, image information can be configured so that primary transform coefficients exist for all positions. For the 4×4 area in the upper left, after the inverse LFNST is applied, the primary transform coefficient exists in that area.

2. According to one embodiment, the zero out area of the primary transform coefficient may be set according to the QP value rather than the block size.

For example, when the QP value is small, that is, when the quantization step size is small or in the case of high bit-rate, this reduces the zero out area for the primary transform coefficient, if the QP value is large, the zero out area for the primary transform coefficient can be maintained or increased compared to the VVC standard.

More specifically, if LFNST has a low QP value when applied (e.g. if the QP value is 27 or less), the primary transform coefficients may not be zeroed out for areas other than the ROI, or the primary transform coefficients may be zeroed out only for 4×4 subblocks whose x-coordinate and y-coordinate values are greater than a certain value. Here the specific value could be 3.

Conversely, if it has a high QP value, the primary transform coefficients can be zeroed out in the same way as in the VVC standard. In other words, the primary transform coefficients can be zeroed out for all areas except the ROI of LFNST. Alternatively, as in the case of low QP, the primary transform coefficient can be zeroed out only for 4×4 subblocks whose x-coordinate and y-coordinate values are greater than a certain value, where the specific value can be 2.

When LFNST is applied, whether or not the primary transform coefficients are zeroed out can be indicated through a high level syntax element (HLS element). High-level syntax elements may be included in the SPS (Sequence Parameter Set), PPS (Picture Parameter Set), PH (Picture Header), etc. in the VVC standard. If the value of the high level syntax element is 1, zero out of the primary transform coefficient is disabled, conversely, if it is 0, the image information can be configured to apply zero out of the primary transform coefficient.

According to one example, when the QP value is small, that is, when the quantization step size value is small, the primary transform coefficient zero out may deteriorate coding performance. Therefore, in this case, the value of the high level syntax element can be set to 1 and the primary transform coefficient zero out can be disabled.

Below, we will look at the LFNST kernel, that is, the LFNST matrix, according to examples in this document.

In the VVC standard, the LFNST kernel matrix may not be a square matrix. In LFNST_8×8, a 16×48 matrix is applied based on the forward LFNST. If a full matrix was included in the standard, a 48×48 matrix could be included instead of a 16×48 matrix, the 16×48 matrix may be a matrix derived by sampling 16 basis vectors from the top of the 48×48 matrix in order of importance. If a 48×48 matrix was applied instead of a 16×48 matrix, the amount of calculation required could increase significantly, however, by applying more basic vectors, there is the advantage of being able to code various patterns that appear in primary transform coefficients through LFNST.

Therefore, according to one example, a square matrix (full-matrix) can be included in the standard as an LFNST kernel, and how many of the basic vectors constituting the square matrix are used can be specified using a high-level syntax element, etc. For example, if the square matrix is a 48×48 matrix and the number 16 can be specified as a high-level syntax element, the 16×48 matrix can be set to be applied as the forward LFNST instead of the 48×48 matrix.

The number of basic vectors, 16, can be directly coded as 16 in a high-level syntax element, one of the possible values (e.g. 8, 16, 24, 32, etc.) can be specified through an index. If it needs to store a square matrix or full-matrix, since it takes up a lot of memory capacity, it may be a disadvantageous configuration in terms of memory usage. However, if the QP value is small (i.e., the quantization step size becomes small, the number of non-zero primary transform coefficients increases, and the pattern of primary transform coefficients in the transform block becomes complex and diverse), coding performance can be increased because coding can be done using a large number of basis vectors.

According to embodiments of this document, the following will look at the LFNST matrix corresponding to LFNST based on the number of multiplication operations per sample.

In the VVC standard, about 4×4 transform block and 8×8 transform block, based on the forward LFNST, an 8×16 matrix (sampling 8 rows from the top from a 16×16 matrix) and an 8×48 matrix (sampling 8 rows from the top from a 16×48 matrix) are applied, respectively, it results in 8 LFNST transform coefficients. This configuration was introduced to keep the worst case calculation amount for LFNST below 8 multiplications per sample (each of MN positions for an M×N transform block is defined as a sample).

If the worst case computation for LFNST is increased to more than 16 multiplications/sample rather than 8 multiplications/sample, for 4×4 transform block and 8×8 transform block, a configuration that derives 8 LFNST transform coefficients can be changed to a configuration that derives 16 LFNST transform coefficients. That is, a 16×16 matrix and a 16×48 matrix can be applied to the 4×4 transform block and 8×8 transform block, respectively.

Additionally, if a 32×64 transform matrix is applied to LFNST_8×8 based on the forward LFNST, the worst-case calculation amount of 16 multiplications/sample can be maintained. In this case, the image information can be configured so that a 16×64 transform matrix that samples 16 basic vectors from the top of the 32×64 transform matrix is applied to the 8×8 transform block. For transform blocks larger than 8×8 transform blocks, the 32×64 transform matrix can be applied as is.

Additionally, when applying a 32×96 transform matrix to LFNST_16×16, even if a 32×96 transform matrix is applied to a transform block larger than 16×16, the calculation amount is 12 multiplications/samples, in the worst case, it is possible to keep the computational amount to 16 multiplications/sample.

Therefore, even if the dimension of the transform matrix for each transform block size becomes larger than the VVC standard (e.g. 32×64 applied with LFNST_8×8, 32×96 applied with LFNST_16×16), by constructing the LFNST matrix by sampling important basis vectors from the square matrix, the number of LFNST transform coefficients can be adjusted, and the calculation amount for the worst case can be maintained at 16 multiplications/sample.

Other embodiments that adjust the worst-case calculation amount by applying the forward LFNST kernel to adjust the number of output transform coefficients are as follows.

1. To adjust the worst-case calculation amount for LFNST to 12 multiplications/sample, the 16×48 transform matrix (in the forward LFNST standard) for LFNST_8×8 in the VVC standard can be changed to a 32×48 transform matrix.

In this case, for an 8×8 transform block, after sampling a 16×48 matrix from that 32×48 matrix (For example, by sampling 16 rows from above), when LFNST is applied, the amount of calculation can be adjusted to the worst case of 12 multiplication number/sample.

2. To adjust the worst-case calculation amount for LFNST to 12 multiplications/sample, the 16×48 transform matrix (in the forward LFNST standard) for LFNST_8×8 in the VVC standard can be changed to a 48×48 transform matrix.

In this case, only basic vectors that do not exceed the complexity according to the transform block size are sampled, that is, by sampling as many rows as the number of basic vectors from the 48×48 matrix, the number of LFNST transform coefficients output can be adjusted. Through this, the calculation amount for the worst case can be set to 12 multiplications/sample.

More specifically, if an n×48 transform matrix sampling n basic vectors is applied to an M×N transform block, the n value can be set to satisfy the condition $((n \times 48)/(M \times N)) \leq 12$. For example, for a 16×16 transform block, if the n value is set to 48, it can be kept to a value smaller than 12 multipliers/sample.

3. A 16×16 transform matrix, a 16×48 transform matrix, and a 32×96 transform matrix can be applied to LFNST_4×4, LFNST_8×8, and LFNST_16×16, respectively.

In this case, even if each transform matrix is applied to the ROI without sampling for all transform block sizes, the calculation amount for the worst case does not exceed 16 multiplications/sample.

4. A 16×16 transform matrix, a 32×64 transform matrix, and a 32×96 transform matrix can be applied to LFNST_4×4, LFNST_8×8, and LFNST_16×16, respectively.

In this case, only for 8×8 transform blocks, a 16×64 transform matrix sampled from a 32×64 transform matrix, that is, a 16×64 transform matrix sampled by selecting 16 rows from the top of the 32×64 transform matrix, can be applied. For transform blocks of the remaining sizes, even if the transform matrix is applied to the ROI as is without sampling, the worst-case calculation does not exceed 16 multiplications/sample.

5. A 16×16 transform matrix, a 32×64 transform matrix, and a 32×64 transform matrix can be applied to LFNST_4×4, LFNST_8×8, and LFNST_16×16, respectively.

The 32×64 transform matrices for LFNST_8×8 and LFNST_16×16 may be the same or different. That is, LFNST_8×8 and LFNST16×16 may completely share the LFNST kernel, or different LFNST kernels may be applied to LFNST_8×8 and LFNST16×16.

This applies a 16×64 matrix sampled from a 32×64 transform matrix only to the 8×8 transform block, for transform blocks of the remaining sizes, even if each corresponding transform matrix is applied to the ROI without sampling, the calculation amount for the worst case does not exceed 16 multiplications/sample.

As described above, the large-sized LFNST kernel matrix can be stored, and the number of generated transform coefficients can be adjusted for each block size according to the amount of calculation for the set worst case. LFNST application modes can be defined for various scenarios and the corresponding modes can be specified through high-level syntax elements. For example, it is possible to define modes based on the number of multiplications per sample. There are three modes as candidates: (1) 8 multiplications/sample, (2) 12 multiplications/sample, (3) 16 multiplications/sample, any one of the three can be indexed through high-level syntax elements.

The following drawings are made to explain a specific example of the present specification. Since the names of specific devices or names of specific signals/messages/fields described in the drawings are provided as examples, the technical features of the present specification are not limited to the specific names used in the drawings below.

Figure 18:
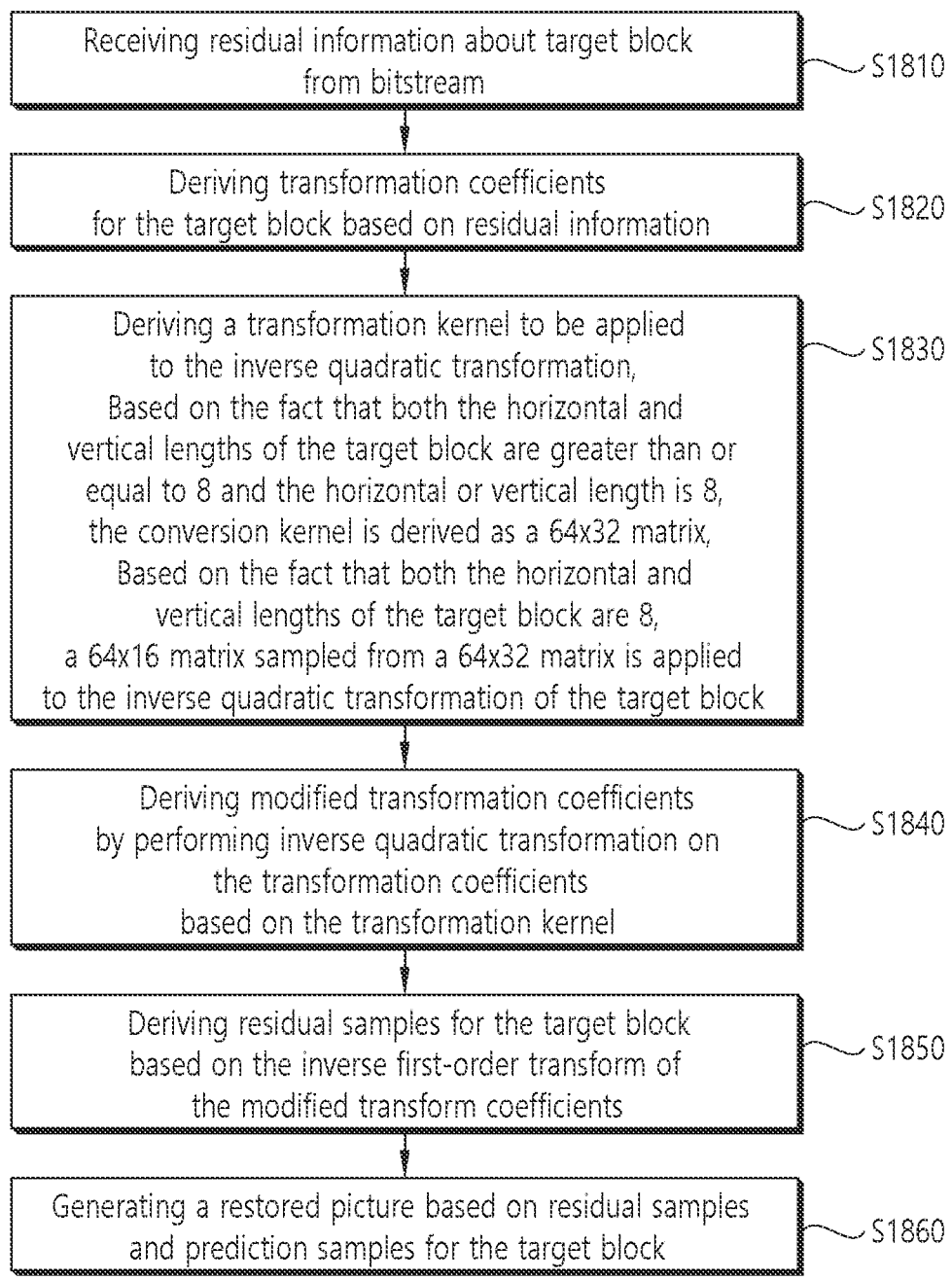
FIG. 18 is a flowchart showing the operation of a video decoding device according to an embodiment of this document.

FIG. 18 is a flowchart illustrating an operation of a video decoding apparatus according to an embodiment of the present document.

Each step disclosed in FIG. 18 is based on some of the contents described above in FIGS. 5 to 17. Therefore, detailed descriptions of overlapping details with those described above in FIGS. 3, 5 to 17 will be omitted or simplified.

The decoding apparatus 300 according to an embodiment may receive residual information about a target block from a bitstream (S1810). The target block may be a coding block or a transform block to be coded or transformed.

The decoding device may obtain information on quantized transform coefficients from the residual information and may receive various information for image decoding. More specifically, the decoding apparatus 300 may decode information about quantized transform coefficients of a target block from a bitstream, it can derive quantized transform coefficients for the target block based on information on quantized transform coefficients for the target block.

Also, information on the LFNST applied to the target block may be received, and the information on the LFNST may be included in a Sequence Parameter Set (SPS) or a slice header. This information may include at least one of information about whether the LFNST applies, information on the minimum transform size to which LFNST is applied, information on the maximum transform size to which LFNST is applied and information about a transform index indicating one of the transform kernels included in the transform set.

The decoding apparatus 300 according to an embodiment may derive transform coefficients for a target block based on residual information (S1820). The decoding device may derive transform coefficients by performing inverse quantization on the quantized transform coefficients of the target block.

The derived transform coefficients may be arranged in a reverse diagonal scan order in units of 4×4 subblocks, transform coefficients in a 4×4 subblock may also be arranged according to an inverse diagonal scan order. That is, transform coefficients on which inverse quantization is performed may be arranged according to an inverse scan order applied in a video codec such as VVC or HEVC.

The decoding device 300 according to one embodiment derives a transform kernel to be applied to the inverse secondary transform (S1830), it can result in modified transform coefficients by performing an inverse secondary transform on the transform coefficients based on the derived transform kernel (S1840).

Based on the fact that the horizontal and vertical lengths of the target block are both greater than or equal to 8, and the horizontal or vertical length is 8, the transform kernel is derived as a 64×32 matrix, based on the fact that both the horizontal and vertical lengths of the target block are 8, a 64×16 matrix sampled from a 64×32 matrix can be applied to the inverse secondary transform of the target block.

According to this document, the inverse secondary transform may include LFNST, that is, a non-separate secondary transform in which RST is reflected, inverse secondary transform can be performed based on the LFNST kernel, the LFNST kernel can be a non-square matrix with fewer columns than rows.

The step of deriving modified transform coefficients may include deriving an input array by arranging transform coefficients according to forward diagonal scanning order, deriving more modified transform coefficients than input transform coefficients through matrix operation of an input array and a transform kernel, and arranging modified transform coefficients in the output area According to this document, unlike the existing VVC standard, LFNST can be applied to the upper left 16×16 region of a transform block larger than 16×16. For example, LFNST may be applied to a region of 96 samples composed of 6 4×4 sub-blocks in the upper left 16×16. That is, based on some transform coefficients belonging to the upper left 16×16 area of the target block, that is, the input array, more modified transform coefficients than transform coefficients can be derived. According to an example, the decoding device may derive L (48<L≤96) modified transform coefficients based on R transform coefficients of the upper left region of the target block, L derived modified transform coefficients (48<L≤96) may be arranged in a predetermined output area. R is smaller than L. Meanwhile, in this document, the fact that the M×N block is larger than the K×L block may indicate that M and N are larger than or equal to K and L, respectively, and M is larger than K or N is larger than L.

The number R of input transform coefficients constituting the input array and the number L of output transform coefficients arranged in the output region may change according to the dimension of the transform kernel. According to one example, R can be 16, 32, 48, 80, etc., and L can be 64 or 96.

According to one example, the input array is arranged in units of 4×4 sub-blocks that may be arranged in forward diagonal scanning order from the DC position of the target block, it can be sorted according to the forward diagonal scanning order within the 4×4 sub-block. Therefore, R, the number of transform coefficients constituting the input array, may be set to a multiple of 16, which is the number of transform coefficients in the 4×4 subblock.

Since the output area means the area of the input transform coefficient input to perform the secondary transform in the encoding device, if the decoding device performs inverse secondary transform, it may mean an area where output transform coefficients are arranged. The output area may correspond to the ROI described with reference to the above-described drawings.

According to one example, the output area may be composed of a plurality of 4×4 sub-blocks that may be arranged according to a scanning order from the DC position of the target block as shown in FIGS. 8 to 10. Also, the output area may be composed of a plurality of p×q sub-blocks that may be arranged in a predetermined order from the DC position of the target block. Alternatively, the output area may be an upper left m×n block (m≤M, n≤N) of the target block, or may have a non-square shape as shown in FIG. 11.

Or according to another example, the output area may have a more complex and irregular shape rather than a rectangular shape, for example, it may include a fan-shaped area composed of lines spaced apart at the same distance from the DC position of the target block. Since the transform coefficient is highly likely to be concentrated around the DC position, the output region may be set as a set of transform coefficients spaced apart from the DC position by a certain distance.

The modified transform coefficients may be arranged in the output region in either a row-first direction or a column-first direction according to the intra prediction mode of the target block. The intra prediction mode that can be applied to the target block is one of 65 directional modes, the intra prediction mode is symmetric about the intra prediction mode No. 34 in the upper left diagonal direction, if the intra-prediction mode applied to the target block is the second to the 34th mode in the left direction based on the intra-prediction mode 34, the modified transform coefficients may be 2-dimensionally arranged in the output region according to a row-major order. If the intra prediction mode applied to the target block is the 35th to the 66th mode in the right direction based on the 34th intra prediction mode, the modified transform coefficients may be arranged in a two-dimensional manner according to a column-first direction. In addition, if the intra prediction mode applied to the target block is the planner mode or the DC mode, the modified transform coefficients may be 2-dimensionally arranged in the output region according to a row-major order.

Meanwhile, deriving a modified transform coefficient may include deriving a transformation kernel for transformation, a transform kernel may be derived based on a transform set derived based on an intra prediction mode applied to a target block.

As shown in Table 2, a plurality of transform sets exist based on the mapping relationship with the intra prediction mode, one transform set may consist of a plurality of transform kernels. Which of the transform kernels constituting the transform set to apply to the LFNST can be indicated from the transform index.

On the other hand, the size of the inverse secondary transform can be set based on the size of the target block, at least one of the number of transform sets, the number of transform kernels constituting the transform set, and the dimension of the transform kernel may be derived based on the size of the inverse secondary transform.

Based on the fact that both the horizontal and vertical lengths of the target block are greater than or equal to 4 and the horizontal or vertical length is 4, the size of the inverse secondary transform may be set to a first value. For example, the first value may be set to 2. When the size of the inverse secondary transform is 2. LFNST is applied to the upper left 4×4 region of the target block, and may correspond to the aforementioned LFNST_4×4.

Alternatively, the size of the inverse secondary transform may be set to a second value based on the fact that both the horizontal and vertical lengths of the target block are greater than or equal to 8 and the horizontal and vertical lengths are 8. For example, the second value may be set to 3. When the size of the inverse secondary transform is 3, LFNST is applied to the upper left 8×8 region of the target block, and may correspond to the aforementioned LFNST_8×8.

Alternatively, the size of the inverse secondary transform may be set to a third value based on the fact that both the horizontal and vertical lengths of the target block are greater than or equal to 16. For example, the third value may be set to 4. When the size of the inverse secondary transform is 4. LFNST is applied to the upper left 16×16 region of the target block, and may correspond to the aforementioned LFNST_16×16.

Based on grouping according to the size of the inverse secondary transform, that is, the size to which LFNST is applied, at least one of the number of transform sets applied to the target block, the number of transform kernels constituting the transform set, and the dimension of the transform kernel may be derived. In other words, the number of transform sets, the number of transform kernels constituting the transform set, and the dimensions of the transform kernels can be set and configured in various ways according to the size of the inverse secondary transform or the size of the target block.

For example, based on the fact that the size of the inverse secondary transform is 2, the dimension of the transform kernel may be set to 16×16. In addition, based on the fact that the size of the inverse secondary transform is 3, the dimension of the transformation kernel can be set to 48×R or 64×S, in this case. R may be set to one of 16, 32, and 48, and S may be set to one of 16, 32, 48, and 64. In addition, based on the fact that the size of the inverse secondary transform is 4, the dimension of the transformation kernel is set to one of 96×R, 64×S or 48×T, R is any one of 16, 32, 48, 64, 80, 96, S is any one of 16, 32, 48, and 64, and T can be set to any one of 16, 32, and 48.

Or, according to one example, based on the size of the inverse secondary transform being 1, that is, both the horizontal and vertical lengths of the target block are greater than or equal to 4, if the horizontal or vertical length is 4, the dimension of the transform kernel applied to LFNST4×4 may be 16×16.

Or, according to one example, based on the fact that both the horizontal and vertical lengths of the target block are greater than or equal to 8, and the horizontal or vertical length is 8, that is, when LFNST_8×8 is applied, the transform kernel can be set to a 64×32 matrix. At this time, if both the horizontal and vertical lengths of the target block are 8, the 64×16 matrix sampled from the 64×32 matrix can be applied to the inverse secondary transform.

According to an embodiment of this document, the LFNST transform kernel can be derived based on the number of multiplication operations per sample. The worst case calculation amount for LFNST can be set to 16 multiplications/sample or 12 multiplications/sample, and the number of modified transform coefficients to which LFNST is applied can be adjusted correspondingly.

If the worst case calculation amount for LFNST is set to 16 multiplications/sample, a 16×16 transform matrix, a 64×32 transform matrix, and a 96×32 transform matrix can be applied as LFNST_4×4, LFNST_8×8, and LFNST_16×16, respectively. At this time, only for 8×8 transform blocks, a 64×16 transform matrix sampled from a 64×32 transform matrix, that is, a 64×16 transform matrix sampled by selecting 16 rows from the top of the 64×32 transform matrix, can be applied.

Meanwhile, according to an example, under the condition that LFNST is performed only when a transform coefficient exists in an area (specific area) other than the DC location, the specific area may be set differently from the existing VVC standard. The specific area can be set to various areas according to the size of the inverse secondary transform or the size of the target block.

Meanwhile, according to an example, on the basis that the tree type of the target block is a single tree, inverse secondary transform. i.e., LFNST, may be performed on the luma component and chroma component of the target block. Alternatively, according to another example, when the tree type of the target block is a dual tree, LFNST may not be performed on the chroma block.

Meanwhile, according to one example, after the modified transform coefficient is derived, the target block may include an output area where the modified transform coefficients are arranged, a primary transform coefficient area where the primary transform coefficient exists, and a zero out area where the transform coefficient value is 0.

This primary transform coefficient area may include 4×4 sub-blocks in the diagonal direction that are in contact with the output area composed of diagonal CG.

For example, as shown in FIG. 16, the second or third CG in the diagonal direction may not be zeroed out and primary transform coefficients may exist.

Alternatively, as shown in (b) or (c) of FIG. 17, at least one 4×4 sub-block adjacent to the output area in a transform block to which LFNST_4×4 is applied may include primary transform coefficients without being zeroed out.

According to another example, the zero out area of the transform block may be determined according to the QP value. If the QP value is small, the zero out area can be reduced, and if the QP value is large, the zero out area can be maintained as before or expanded.

The decoding apparatus 300 according to an embodiment may derive residual samples for a target block based on an inverse primary transform for modified transform coefficients (S1850).

The decoding device 300 may perform inverse primary transform on the modified transform coefficients of the target block, in this case, a simplified inverse transform may be applied to the inverse primary transform, or a normal separation transform may be used.

According to an embodiment, LFNST may also be applied to a target block to which DST-7, DCT-8, or Karhunen Loeve Transform (KLT) is applied as an inverse primary transform.

Alternatively, according to an example, LFNST may also be applied to a target block to which transform skip is applied to horizontal transformation or vertical transformation.

Depending on the transformation kernel (DCT-2, DST-7, DCT-8, etc.) or combination of transformation kernels applied to the inverse primary transform, it is possible to design various combinations of the number of transformation sets, the number of transformation kernels constituting the transformation set, and the dimensions of the transformation kernels.

The decoding apparatus 300 according to an embodiment may generate a reconstructed picture based on residual samples of the target block and prediction samples of the target block (S1860).

According to an example of this document, LFNST may be applied not only to intra prediction but also to a target block from which prediction samples are derived based on inter prediction. Transform sets, transform kernels, and the like may be designed in various ways according to motion information and characteristics of motion vectors.

The following drawings are made to explain a specific example of the present specification. Since the names of specific devices or names of specific signals/messages/fields described in the drawings are provided as examples, the technical features of the present specification are not limited to the specific names used in the drawings below.

Figure 19:
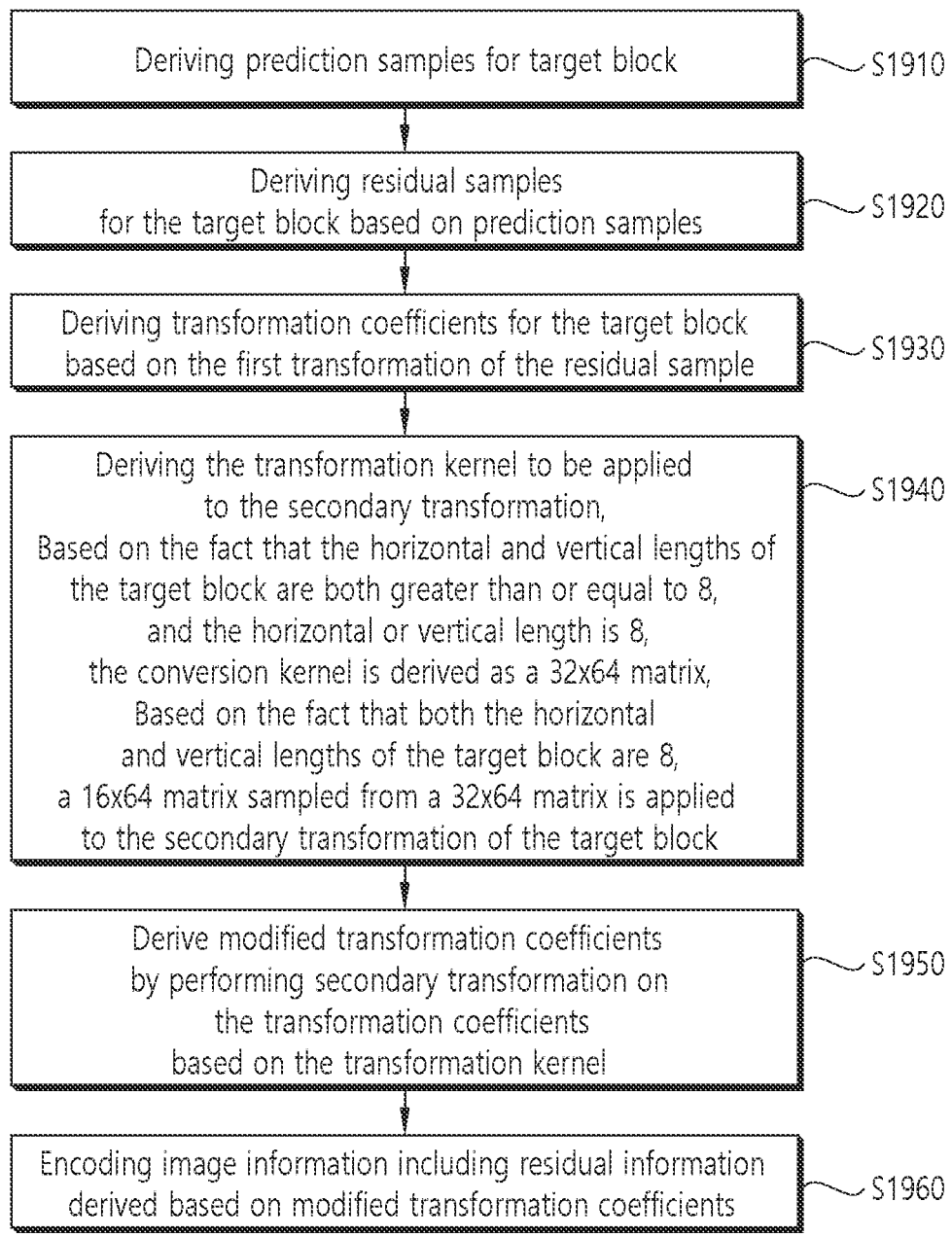
FIG. 19 is a flowchart showing the operation of a video encoding device according to an embodiment of this document.

FIG. 19 is a flowchart illustrating an operation of a video encoding apparatus according to an embodiment of the present document.

Each step disclosed in FIG. 19 is based on some of the contents described above in FIGS. 5 to 17. Therefore, descriptions of details overlapping with those described above in FIGS. 2 and 5 to 17 will be omitted or simplified.

The encoding apparatus 200 according to an embodiment may derive prediction samples based on a prediction mode applied to the target block (S1910).

According to an example of this document, LFNST may be applied not only to intra prediction but also to a target block from which prediction samples are derived based on inter prediction. Depending on the characteristics of motion information and motion vectors, transform sets and transform kernels, which will be described later, can be designed in various ways.

The encoding apparatus 200 according to an embodiment may derive residual samples for a target block based on prediction samples (S1920).

The encoding apparatus 200 according to an embodiment may derive transform coefficients for the target block based on a primary transform for residual samples (S1930).

The primary transform may be performed through a plurality of transform kernels, and in this case, a transform kernel may be selected based on an intra prediction mode.

A simplified inverse transform may be applied to the primary transform, or a normal separation transform may be used.

DCT-2, DST-7, DCT-8 or KLT (Karhunen Loeve Transform) may be applied as the primary transform, according to an embodiment of the present document, LFNST may also be applied to a target block to which DST-7, DCT-8, or KLT, etc., rather than DCT-2, is applied as a primary transform.

Alternatively, according to an example, LFNST may also be applied to a target block to which transform skip is applied to horizontal transformation or vertical transformation.

Depending on the transformation kernel (DCT-2, DST-7, DCT-8, etc.) applied to the primary transform or a combination of transformation kernels, various combination designs are possible for the number of transformation sets applied to the LFNST, the number of transformation kernels constituting the transformation set, and the dimensions of the transformation kernels.

The encoding device 200 according to one embodiment derives a transform kernel to be applied to the secondary transform (S1940), by performing secondary transform on the transform coefficient based on the derived transform kernel, modified transform coefficients for the target block can be derived (S1950).

Based on the fact that the horizontal and vertical lengths of the target block are both greater than or equal to 8, and the horizontal or vertical length is 8, the transform kernel is derived as a 32×64 matrix, based on the fact that both the horizontal and vertical lengths of the target block are 8, a 16×64 matrix sampled from a 32×64 matrix can be applied to the secondary transform of the target block.

According to this document, the secondary transform may include LFNST, that is, a non-separate secondary transform in which RST is reflected, secondary transform can be performed based on the LFNST kernel, the LFNST kernel can be a non-square matrix with fewer rows than columns.

According to this document, unlike the existing VVC standard, LFNST can be applied to the upper left 16×16 region of a transform block larger than 16×16. For example, LFNST may be applied to a region of 96 samples composed of 6 4×4 sub-blocks in the upper left 16×16. That is, based on some transform coefficients belonging to the upper left 16×16 area of the target block, modified transform coefficients smaller than the transform coefficients can be derived. According to an example, based on the fact that the size of the target block is M×N (M≥16, N≥16), the encoding device may derive R modified transform coefficients based on L (48<L≤96) transform coefficients of the upper left region of the target block. The derived R modified transform coefficients may be derived as an output array according to a predetermined scanning order. R is smaller than L.

The input region, which means the region of the input transform coefficient to be subjected to secondary transform in the encoding device, may correspond to the output region described in the decoding method and the ROI described with reference to the above-mentioned drawings. Therefore, redundant description of the ROI is omitted.

The number L of input transform coefficients arranged in the input region and the number R of modified transform coefficients derived through matrix operation may change according to the dimension of the transform kernel. According to one example, R can be 16, 32, 48, 80, etc., and L can be 64 or 96.

Meanwhile, according to one example, the target block may include an input area where transform coefficients subject to LFNST application are arranged, a primary transform coefficient area where a primary transform coefficient exists, and a zero-out area where the transform coefficient value is 0.

This primary transform coefficient area may include 4×4 sub-blocks in the diagonal direction that contact the input area composed of diagonal CG.

For example, as shown in FIG. 16, the second or third CG in the diagonal direction may not be zeroed out and primary transform coefficients may exist.

Alternatively, as shown in (b) or (c) of FIG. 17, in a transform block to which LFNST_4×4 is applied, at least one 4×4 sub-block adjacent to the input area may include primary transform coefficients without being zeroed out.

According to another example, the zero out area of the transform block may be determined according to the QP value. If the QP value is small, the zero out area can be reduced, and if the QP value is large, the zero out area can be maintained as before or expanded.

According to an example, the modified transform coefficients are arranged in units of 4×4 subblocks that may be arranged in forward diagonal scanning order from the DC position of the target block, it can be sorted according to the forward diagonal scanning order within the 4×4 sub-block. Therefore, R, the number of modified transform coefficients, may be set as a multiple of 16, which is the number of transform coefficients in a 4×4 subblock.

As described above, deriving a modified transform coefficient may include deriving a transform kernel for transformation, a transform kernel may be derived based on a transform set derived based on an intra prediction mode applied to a target block.

As shown in Table 2, a plurality of transform sets exist based on the mapping relationship with the intra prediction mode, one transform set may consist of a plurality of transform kernels. Which of the transform kernels constituting the transform set to apply to the LFNST can be encoded as a transform index.

Meanwhile, the size of the secondary transform can be set based on the size of the target block, at least one of the number of transform sets, the number of transform kernels constituting the transform set, and the dimension of the transform kernel may be derived based on the size of the secondary transform.

Based on the fact that both the horizontal and vertical lengths of the target block are greater than or equal to 4 and the horizontal or vertical length is 4, the size of the secondary transform may be set to a first value. For example, the first value may be set to 2. The size of the secondary transform is 2, LFNST is applied to the upper left 4×4 region of the target block, and may correspond to the aforementioned LFNST_4×4.

Alternatively, the size of the secondary transform may be set to a second value based on the fact that both the horizontal and vertical lengths of the target block are greater than or equal to 8 and the horizontal and vertical lengths are 8. For example, the second value may be set to 3. The size of the secondary transform of 3 means that the LFNST is applied to the 8×8 region at the top left of the target block, and may correspond to the aforementioned LFNST_8×8.

Alternatively, the size of the secondary transform may be set to a third value based on the fact that both the horizontal and vertical lengths of the target block are greater than or equal to 16. For example, the third value may be set to 4. When the size of the secondary transform is 4, LFNST is applied to the upper left 16×16 region of the target block, which may correspond to the aforementioned LFNST_16×16.

Based on grouping according to the size of the secondary transform, that is, the size to which LFNST is applied, at least one of the number of transform sets applied to the target block, the number of transform kernels constituting the transform set, and the dimension of the transform kernel may be derived. In other words, the number of transform sets, the number of transform kernels constituting the transform set, and the dimension of transform kernels may be set and configured in various ways according to the size of the secondary transform or the size of the target block.

For example, based on the fact that the size of the secondary transform is 2, the dimension of the transform kernel may be set to 16×16. In addition, based on the size of the secondary transform being 3, the dimension of the transformation kernel can be set to R×48 or S×64, in this case, R may be set to one of 16, 32, and 48, and S may be set to one of 16, 32, 48, and 64. In addition, based on the size of the secondary transform being 4, the dimension of the transformation kernel is set to one of R×96, S×64 or T×48, R is any one of 16, 32, 48, 64, 80, 96, S is any one of 16, 32, 48, and 64, and T can be set to any one of 16, 32, and 48.

Or, according to one example, based on the size of the secondary transform being 1, that is, if both the horizontal and vertical lengths of the target block are greater than or equal to 4, and the horizontal or vertical length is 4, the dimension of the transform kernel applied to LFNST4×4 may be 16×16.

Or, according to one example, based on the fact that both the horizontal and vertical lengths of the target block are greater than or equal to 8, and the horizontal or vertical length is 8, that is, when LFNST_8×8 is applied, the transform kernel can be set to a 32×64 matrix. At this time, if both the horizontal and vertical lengths of the target block are 8, a 16×64 matrix sampled from a 32×64 matrix can be applied to the secondary transform.

According to an embodiment of this document, the LFNST transform kernel can be derived based on the number of multiplication operations per sample. The worst case calculation amount for LFNST can be set to 16 multiplications/sample or 12 multiplications/sample, and the number of modified transform coefficients to which LFNST is applied can be adjusted correspondingly.

If it sets the worst case computational amount for LFNST to 16 multiplications/sample, a 16×16 transform matrix, a 32×64 transform matrix, and a 32×96 transform matrix can be applied with LFNST_4×4, LFNST_8×8, and LFNST_16×16, respectively. At this time, only for 8×8 transform blocks, a 16×64 transform matrix sampled from a 32×64 transform matrix, that is, a 16×64 transform matrix sampled by selecting 16 rows from the top of the 32×64 transform matrix, can be applied.

Meanwhile, according to an example, under the condition that LFNST is performed only when a transform coefficient exists in an area (specific area) other than the DC location, the specific area may be set differently from the existing VVC standard. The specific area can be set to various areas according to the size of the inverse secondary transform or the size of the target block.

Meanwhile, according to an example, secondary transform, i.e., LFNST, may be performed on the luma component and the chroma component of the target block based on a tree type of the target block being a single tree. Alternatively, according to another example, when the tree type of the target block is a dual tree, LFNST may not be performed on the chroma block.

The encoding apparatus 200 according to an embodiment may encode image information including residual information about a target block (S1960).

The encoding device derives quantized transform coefficients by performing quantization based on modified transform coefficients, residual information about quantized transform coefficients may be generated and encoded. The residual information may include the above-described transformation related information/syntax element. The encoding device may encode image/video information including residual information and output the encoded image/video information in the form of a bitstream.

In addition, the encoding device may also encode information about the LFNST applied to the target block, information on the LFNST may be included in a Sequence Parameter Set (SPS) or a slice header. This information may include at least one of information about whether the LFNST applies, information on the minimum transform size to which LFNST is applied, information on the maximum transform size to which LFNST is applied and information about a transform index indicating one of the transform kernels included in the transform set.

In the present disclosure, at least one of quantization/dequantization and/or transform/inverse transform may be omitted. When quantization/dequantization is omitted, a quantized transform coefficient may be referred to as a transform coefficient. When transform/inverse transform is omitted, the transform coefficient may be referred to as a coefficient or a residual sample, or may still be referred to as a transform coefficient for consistency of expression.

In addition, in the present disclosure, a quantized transform coefficient and a transform coefficient may be referred to as a transform coefficient and a scaled transform coefficient, respectively. In this case, residual information may include information on a transform coefficient(s), and the information on the transform coefficient(s) may be signaled through a residual coding syntax. Transform coefficients may be derived based on the residual information (or information on the transform coefficient(s)), and scaled transform coefficients may be derived through inverse transform (scaling) of the transform coefficients. Residual samples may be derived based on the inverse transform (transform) of the scaled transform coefficients. These details may also be applied/expressed in other parts of the present disclosure.

In the above-described embodiments, the methods are explained on the basis of flowcharts by means of a series of steps or blocks, but the present disclosure is not limited to the order of steps, and a certain step may be performed in order or step different from that described above, or concurrently with another step. Further, it may be understood by a person having ordinary skill in the art that the steps shown in a flowchart are not exclusive, and that another step may be incorporated or one or more steps of the flowchart may be removed without affecting the scope of the present disclosure.

The above-described methods according to the present disclosure may be implemented as a software form, and an encoding apparatus and/or decoding apparatus according to the disclosure may be included in a device for image processing, such as, a TV, a computer, a smartphone, a set-top box, a display device or the like.

When embodiments in the present disclosure are embodied by software, the above-described methods may be embodied as modules (processes, functions or the like) to perform the above-described functions. The modules may be stored in a memory and may be executed by a processor. The memory may be inside or outside the processor and may be connected to the processor in various well-known manners. The processor may include an application-specific integrated circuit (ASIC), other chipset, logic circuit, and/or a data processing device. The memory may include a read-only memory (ROM), a random access memory (RAM), a flash memory, a memory card, a storage medium, and/or other storage device. That is, embodiments described in the present disclosure may be embodied and performed on a processor, a microprocessor, a controller or a chip. For example, function units shown in each drawing may be embodied and performed on a computer, a processor, a microprocessor, a controller or a chip.

Further, the decoding apparatus and the encoding apparatus to which the present disclosure is applied, may be included in a multimedia broadcasting transceiver, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an over the top (OTT) video device, an Internet streaming service providing device, a three-dimensional (3D) video device, a video telephony video device, and a medical video device, and may be used to process a video signal or a data signal. For example, the over the top (OTT) video device may include a game console, a Blu-ray player, an Internet access TV, a Home theater system, a smartphone, a Tablet PC, a digital video recorder (DVR) and the like.

In addition, the processing method to which the present disclosure is applied, may be produced in the form of a program executed by a computer, and be stored in a computer-readable recording medium. Multimedia data having a data structure according to the present disclosure may also be stored in a computer-readable recording medium. The computer-readable recording medium includes all kinds of storage devices and distributed storage devices in which computer-readable data are stored. The computer-readable recording medium may include, for example, a Blu-ray Disc (BD), a universal serial bus (USB), a ROM, a PROM, an EPROM, an EEPROM, a RAM, a CD-ROM, a magnetic tape, a floppy disk, and an optical data storage device. Further, the computer-readable recording medium includes media embodied in the form of a carrier wave (for example, transmission over the Internet). In addition, a bitstream generated by the encoding method may be stored in a computer-readable recording medium or transmitted through a wired or wireless communication network. Additionally, the embodiments of the present disclosure may be embodied as a computer program product by program codes, and the program codes may be executed on a computer by the embodiments of the present disclosure. The program codes may be stored on a computer-readable carrier.

Claims disclosed herein can be combined in a various way. For example, technical features of method claims of the present disclosure can be combined to be implemented or performed in an apparatus, and technical features of apparatus claims can be combined to be implemented or performed in a method. Further, technical features of method claims and apparatus claims can be combined to be implemented or performed in an apparatus, and technical features of method claims and apparatus claims can be combined to be implemented or performed in a method.

What is claimed is:

1. A method for image decoding, the method performed by a decoding apparatus and comprising:
    deriving transform coefficients for a target block based on residual information obtained from a bitstream;
    deriving modified transform coefficients based on an inverse second-order transform for the transform coefficients;
    deriving residual samples for the target block based on an inverse first-order transform of the modified transform coefficients
    wherein the deriving the modified transform coefficients includes deriving a transform kernel to be applied to the inverse second-order transform,
    wherein, based on that a horizontal length and a vertical length of the target block are both greater than or equal to 8, and the horizontal length or the vertical length is 8, a 64×32 matrix is applied to the inverse second-order transform of the target block, and wherein, based on that both the horizontal length and the vertical length of the target block are 8, a 64×16 matrix, which is sampled from the 64×32 matrix, is applied to the inverse second-order transform of the target block.

2. The method of claim 1, wherein, based on that both the horizontal length and the vertical length of the target block are greater than or equal to 4 and the horizontal length or the vertical length is 4, a 16×16 matrix is applied to the inverse second-order transform of the target block, and wherein, based on that both the horizontal length and the vertical length of the target block are greater than or equal to 16, a 96×32 matrix is applied to the inverse second-order transform of the target block.

3. The method of claim 1, wherein the deriving the modified transform coefficients comprises:

deriving an input array by sorting the transform coefficients according to a forward diagonal scanning order;

deriving a larger number of modified transform coefficients than the transform coefficients through a matrix operation of the input array and a transform kernel; and arranging the modified transform coefficients in an output area, wherein the output area is composed of a plurality of 4×4 sub-blocks that can be arranged according to scanning order from a DC position of the target block.

4. The method of claim 3, wherein, after the modified transform coefficients are derived, the target block includes the output area, a primary transform coefficient area where the transform coefficients exist, and a zero out area where a transform coefficient value is 0.

5. The method of claim 4, wherein the primary transform coefficient area includes 4×4 sub-blocks in a diagonal direction adjacent to the output area.

6. The method of claim 5, wherein, based on that both the horizontal length and vertical length of the target block are greater than or equal to 4 and the horizontal length or the vertical length is 4, the primary transform coefficient area is a right 4×4 subblock or a lower 4×4 subblock of the output area.

7. A method for image encoding, the method performed by an encoding apparatus and comprising:

deriving residual samples for a target block based on prediction samples for the target block;

deriving transform coefficients for the target block based on a first-order transform for the residual samples;

deriving modified transform coefficients based on a second-order transform for the transform coefficients;

encoding image information including residual information derived based on the modified transform coefficients, wherein the deriving the modified transform coefficient includes deriving a transform kernel to be applied to the second-order transform, wherein, based on that a horizontal length and a vertical length of the target block are both greater than or equal to 8, and the horizontal length or the vertical length is 8, a 32×64 matrix is applied to the second-order transform of the target block, and wherein, based on that both the horizontal length and the vertical length of the target block are 8, a 16×64 matrix, which is sampled from the 32×64 matrix, is applied to the second-order transform of the target block.

8. The method of claim 7, wherein, based on that both the horizontal length and the vertical length of the target block are greater than or equal to 4 and the horizontal length or the vertical length is 4, a 16×16 matrix is applied to the second-order transform of the target block, and wherein, based on that both the horizontal length and the vertical length of the target block are greater than or equal to 16, a 32×96 matrix is applied to the second-order transform of the target block.

9. The method of claim 7, wherein the deriving the modified transform coefficients comprises:

deriving an input array by aligning transform coefficients arranged in an upper left input area of the target block;

deriving a smaller number of the modified transform coefficients than the transform coefficients through a matrix operation of the input array and the transform kernel, wherein the input area is composed of a plurality of 4×4 sub-blocks that can be arranged in scanning order from a DC position of the target block.

10. The method of claim 9, wherein the target block includes the input area, a primary transform coefficient area where the transform coefficients exist, and a zero out region where a transform coefficient value is 0.

11. The method of claim 10, wherein the primary transform coefficient area includes 4×4 sub-blocks in a diagonal direction bordering the input area.

12. The method of claim 11, wherein, based on that both the horizontal length and the vertical length of the target block are greater than or equal to 4 and the horizontal length or vertical length is 4, the primary transform coefficient area is a right 4×4 subblock or a lower 4×4 subblock of the input area.

13. A computer-readable digital storage medium, wherein a bitstream generated according to a predetermined method is stored in the computer-readable digital storage medium, the method comprising:

deriving residual samples for a target block based on prediction samples for the target block;

deriving transform coefficients for the target block based on a first-order transform for the residual samples;

deriving modified transform coefficients based on a second-order transform for the transform coefficients;

encoding image information including residual information derived based on the modified transform coefficients to generate the bitstream, wherein the deriving the modified transform coefficient includes deriving a transform kernel to be applied to the second-order transform, wherein, based on that a horizontal length and a vertical length of the target block are both greater than or equal to 8, and the horizontal length or the vertical length is 8, a 32×64 matrix is applied to the second-order transform of the target block, and wherein, based on that both the horizontal length and the vertical length of the target block are 8, a 16×64 matrix, which is sampled from the 32×64 matrix, is applied to the second-order transform of the target block.

* * * * *